(12) United States Patent
Maruyama et al.

(10) Patent No.: US 9,337,942 B2
(45) Date of Patent: *May 10, 2016

(54) PROPAGATION PATH ESTIMATION METHOD AND PROGRAM AND APPARATUS USING THE SAME

(75) Inventors: Tamami Maruyama, Yokohama (JP); Tatsuo Furuno, Yokosuka (JP); Tomoyuki Ohya, Yokohama (JP); Yasuhiro Oda, Yokosuka (JP); Ngoc Hao Tran, Shinagawa-ku (JP); Jiyun Shen, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 714 days.

This patent is subject to a terminal disclaimer.

(21) Appl. No.: 13/514,426

(22) PCT Filed: Dec. 6, 2010

(86) PCT No.: PCT/JP2010/071845
§ 371 (c)(1),
(2), (4) Date: Aug. 10, 2012

(87) PCT Pub. No.: WO2011/071020
PCT Pub. Date: Jun. 16, 2011

(65) Prior Publication Data
US 2012/0302177 A1    Nov. 29, 2012

(30) Foreign Application Priority Data
Dec. 7, 2009    (JP) .................................. 2009-278045

(51) Int. Cl.
*H04B 17/00*    (2015.01)
*H04B 17/391*    (2015.01)
(Continued)

(52) U.S. Cl.
CPC .......... *H04B 17/3912* (2015.01); *H04B 17/104* (2015.01); *H04W 16/18* (2013.01)

(58) Field of Classification Search
CPC .......................... H04B 17/104; H04B 17/3912
USPC .................................... 455/63.4, 67.16, 67.11
See application file for complete search history.

(56) References Cited

U.S. PATENT DOCUMENTS

| 4,201,474 A | 5/1980 | Holl et al. |
| 5,689,812 A | 11/1997 | Takahashi |

(Continued)

FOREIGN PATENT DOCUMENTS

| EP | 2 511 717 A1 | 10/2012 |
| JP | 8 8846 | 1/1996 |

(Continued)

OTHER PUBLICATIONS

Office Action issued Jan. 13, 2014 in Chinese Patent Application No. 201080055588.0 (with English language translation).

(Continued)

*Primary Examiner* — Ayodeji Ayotunde
(74) *Attorney, Agent, or Firm* — Oblon, McClelland, Maier & Neustadt, L.L.P.

(57) ABSTRACT

A propagation path estimation method using an imaging method according to the invention includes a step of, in a case where a reflectarray which causes reflection and scattering in a different direction $(\theta-\eta)°$ from a specular reflection direction $\theta°$ exists on a propagation path from a transmission point to a reception point RX of the radio wave, calculating a virtual reception point VRX by rotating the reception point RX about a rotation center point O, and estimating the propagation path by using the virtual reception point VRX.

13 Claims, 41 Drawing Sheets

(51) Int. Cl.
*H04B 17/10* (2015.01)
*H04W 16/18* (2009.01)

(56) References Cited

U.S. PATENT DOCUMENTS

2008/0161005 A1* 7/2008 Sato et al. ............... 455/446
2010/0076730 A1* 3/2010 Yonezawa et al. ........... 703/1
2012/0303328 A1* 11/2012 Maruyama et al. ......... 702/189

FOREIGN PATENT DOCUMENTS

JP   2003 318842   11/2003
JP   2009 168534    7/2009

OTHER PUBLICATIONS

"Research related to theory and method of ray tracing to determine the location of a mobile terminal of a cellular communication system", Entire database of Chinese doctoral dissertation: Information Science and Technology Series, Dec. 15, 2004, pp. 43-50 (with English language translation).

Furuno, T. et al., "A Propagation Estimation Method for Using Beam Controlled Reflector", Proceedeings of the IEICE Conference, vol. 2009, Tsushin 1, B-1-18, p. 18, (Mar. 4, 2009) (with English translation).

Furuno, T. et al., "A Study of Area Coverage Improvement by using Beam Controlled Reflector", Proceedings of the IEICE Conference, vol. 2009, Tsushin Society 1, B-1-19, p. 19, (Sep. 1, 2009) (with English translation).

Hosoya, Y., "Denpadenpan Handbook (Radiowave Propagation Handbook)," pp. 234-245, (Jan. 1999) (with English translation).

EEM-RTM, "Theory Manual", Information and Mathematical Sci. Lab. Inc., Total 37 Pages, (Nov. 2006) (with English translation).

Li, L. et al., "Microstrip Reflectarry Using Crossed-Dipole with Frequency Selective Surface of Loops", ISAP2008, TP-C05, 1645278, Total 4 Pages, (2008).

Maruyama, T. et la., "Experiment and Analysis of Reflect Beam Direction Control using a Reflector having Periodic Tapered Mushroom-like Structure", ISAP2008, MO-ISI, 1644929, p. 9, (2008).

Seidel, S. Y., "A Ray Tracing Technique to Predict Path Loss and Delay Spread Inside Buildings", IEEE GLOBECOM'92, vol. 2, pp. 649-653, (1992).

Internationa Search Report Issued Feb. 1, 2011 in PCT/JP10/71845 filed Dec. 6, 2012.

Extended European Search Report issued Mar. 30, 2015 in Patent Application No. 10835940.7.

Kai Chang, et al., "Circularly Polarized Reflectarray With Microstrip Ring Elements Having Variable Rotation Angles", IEEE Transactions on Antennas and Propagation, vol. 52, No. 4, XP 011111953, (Apr. 2004), pp. 1122-1125.

* cited by examiner

--Background Art--

--Background Art--

--Background Art--

PROPAGATION PATH ESTIMATION METHOD AND PROGRAM AND APPARATUS USING THE SAME

TECHNICAL FILED

The present invention relates to a propagation path estimation method, program and apparatus.

More particularly, the present invention relates to a unit configured to analyze a scatterer not making a specular reflection in an analysis such as GO and GTD using a geometric-optical model, a ray tracing analysis and an analysis using an imaging method.

BACKGROUND ART

Conventionally, an analysis method using a geometric-optical model is widely known as a method for analyzing the propagation characteristics of radio wave (for example, see Non-Patent Document 1).

FIG. 1 shows a method for obtaining a radio wave propagation path by a conventional ray trace method.

As shown in FIG. 1, the conventional ray trace method includes three steps. The first step determines an image point T' of a transmission point T with respect to a wall surface 1 and then determines an image point T" of the image point T' with respect to a wall surface 2.

In the second step, T" and a reception point R are connected to each other with a straight light, and a point where the straight line and the wall surface 2 intersect to each other is obtained. The intersection point thus obtained is a reflection point X2 on the wall surface 2.

In the third step, the reflection point X2 on the wall surface 2 and T' are connected to each other with a straight line to obtain a reflection point X1 on the wall surface 1.

In this case, the propagation distance takes the same value as a length of the straight line connecting T" and the reception point R to each other. The electric field intensity at the reception point R can be obtained using the propagation distance.

FIG. 2 shows a conventional method for obtaining the propagation paths of a transmitted wave and a reflected wave (for example, see Non-Patent Document 2).

Further, Patent Document 1 discloses a method for estimating propagation characteristics for a case in which a transmission direction is other than a rectilinear direction, and a reflection direction is other than a specular reflection direction.

PRIOR ART DOCUMENTS

Patent Document

Patent Document 1: Japanese Patent Application Publication No. 2009-168534

Non-Patent Documents

Non-Patent Document 1: Yoshio Hosoya, "DENPA DENPAN HANDBOOK (Radiowave Propagation Handbook)," p. 234-245, Realize Inc.
Non-Patent Document 2: "EEM-RTM RIRON SETSUMEISHO," JOUHOUSUURI KENKYUSHO, http://www.imslab.co.jp/R Product/eem/doc/rtm_theory.pdf
Non-Patent Document 3: L. Li, Q. Chen, Q. Yuan, K. Sawaya, T. Maruyama, T. Furuno and S. Uebayashi, "Miscrostrip Reflectarray Using Crossed-Dipole with Frequency Selective Surface of Loops" ISAP2008, TP-C05, 1645278, 2008
Non-Patent Document 4: T. Maruyama, T. Furuno and S. Uebayashi: "Experiment and Analysis of Reflect Beam Direction Control using a Reflector having Periodic Tapered Mushroom-like Structure," 1SAP2008, MO-IS1, 1644929, p. 9, 2008

SUMMARY OF THE INVENTION

In the methods mentioned above, however, the travel direction of the reflected wave is limited to a specular reflection direction (normal reflection direction), and the travel direction of the transmitted wave is limited to a rectilinear direction, as shown in FIG. 1 and FIG. 2.

Accordingly, the above methods have not been capable of analyzing propagation characteristics of scattering in a direction other than the specular reflection direction and propagation characteristics with refraction of a medium taken into account.

FIG. 3 shows an example of the propagation path of scattering in a direction other than the specular reflection direction.

In FIG. 3, a wall surface 3 and a wall surface 4 are scatterers not causing reflection in the specular reflection direction (for example, a directional scatterer such as a reflectarray). The reflected wave scatters in a direction different from the specular reflection direction. On the wall surface 3, radio wave incident from an incident direction A1° scatters in a reflection direction A2° at a reflection point x3. On the wall surface 4, radio wave incident from an incident direction B1° scatters in a reflection direction B2° at a reflection point x4.

As a result of obtaining the path of the radio wave for the above case by using a conventional imaging method, the reflection point on the wall surface is x2, which is different from the reflection point x4. This indicates that the reflection point on the wall surface 4 cannot be obtained by the convention method shown in FIG. 1. Accordingly, the conventional imaging method has a problem that the propagation path cannot be calculated by using a mirror image.

Meanwhile, in recent years, there have been reported application examples using a reflectarray or metamaterial as a directional scatterer for improvement of the propagation environment (Non-Patent Documents 3 and 4).

Analyzing propagation characteristics of radio wave when the directional scatterer exists in a propagation path of the radio wave between the transmission point T and the reception point R is important in analyzing effects of improving the propagation environment, but the analysis has been difficult with a conventional ray trace method.

In contrast, the method disclosed in Patent Document 1 can estimate the propagation path by using an algorithm of obtaining a path and deleting the path, but cannot estimate the propagation path only on the basis of the structure thereof before the analysis. Hence, the method has a drawback of needing the calculation more frequently.

The present invention has been made to solve the problems mentioned above. It is an objective of the present invention to provide a propagation path estimation method, program and apparatus that are capable of estimating a propagation path in a propagation analysis model including a directional scatterer, and of performing a ray trace analysis or an analysis applying geometric-optical model.

The first feature of the present invention is summarized in that a propagation path estimation method using an imaging method, the method comprising a step of, in a case where a structure which causes reflection and scattering in a different direction $(\theta-\eta)°$ from a specular reflection direction $\theta°$ exists on a propagation path from a transmission point to a reception point RX of the radio wave, calculating a virtual reception point VRX by rotating the reception point RX by η° about a rotation center point O, and estimating the propagation path by using the virtual reception point VRX.

The second feature of the present invention is summarized in that a propagation path estimation method using an imaging method, the method comprising a step of, in a case where a structure which causes reflection and scattering in a different direction (θ−η)° from a specular reflection direction θ° exists on a propagation path from a transmission point to a reception point RX of the radio wave, calculating a virtual transmission point VTX by rotating the transmission point TX by η° about a rotation center point, and estimating the propagation path by using the virtual transmission point VTX.

The third feature of the present invention is summarized in that a propagation path estimation method comprising the steps of: in a case where radio wave is reflected or scattered by a first structure which reflects and scatters the radio wave in a different direction (θ−η)° from a specular reflection direction θ°, and then is reflected or scattered by a second structure which reflects and scatters the radio wave in the specular reflection direction θ°, calculating a first image point of a transmission point with respect to the first structure and calculating a second image point of the first image point with respect to the second structure by using an imaging method; calculating a virtual reception point by rotating a reception point by η° about a rotation center point O; estimating a propagation path by using the second image point and the virtual reception point.

The fourth feature of the present invention is summarized in that a propagation path estimation method comprising the steps of: in a case where radio wave is reflected or scattered by a first structure which reflects and scatters the radio wave in a specular reflection direction θ°, and then is reflected or scattered by a second structure which reflects and scatters the radio wave in a different direction (θ−η)° from the specular reflection direction θ°, calculating a virtual reception point by rotating a transmission point by η° about a rotation center point O; calculating a first image point of the virtual transmission point with respect to the first structure and calculating a second image point of the first image point with respect to the second structure by using an imaging method; and estimating a propagation path by using the second image point and a reception point.

MODES FOR CARRYING OUT THE INVENTION

First Embodiment of the Present Invention

A propagation path estimation method according to a first embodiment of the present invention is described with reference to FIG. 4 and FIG. 5.

Figure 1:
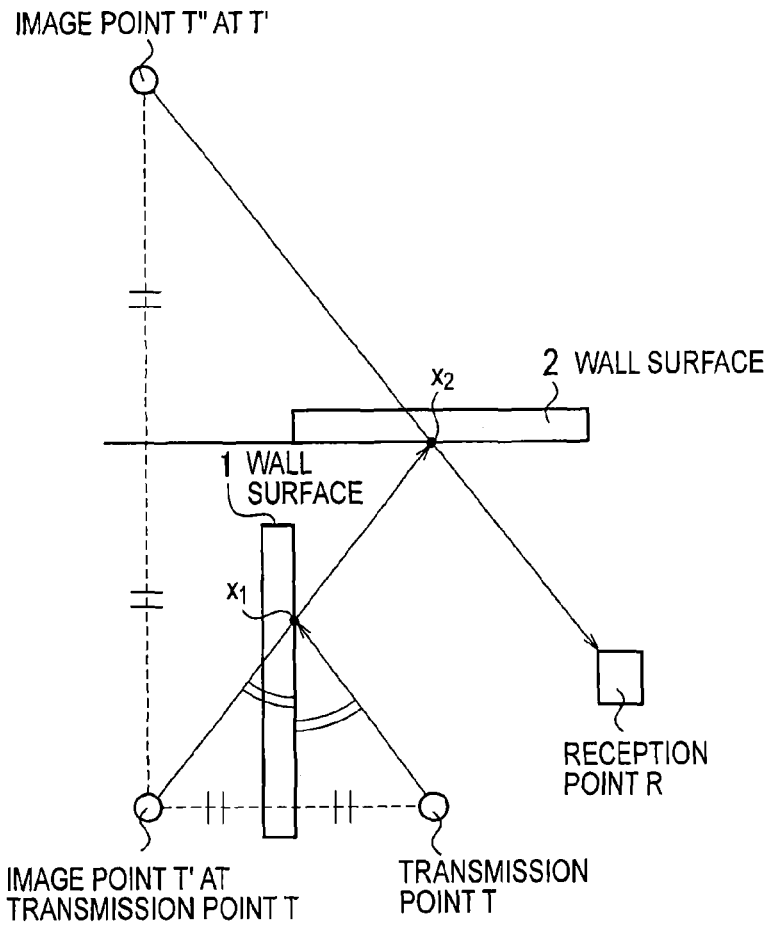
FIG. 1 is a diagram for explaining a method for obtaining the propagation path of radio wave by a conventional ray tracing method.
Figure 2:
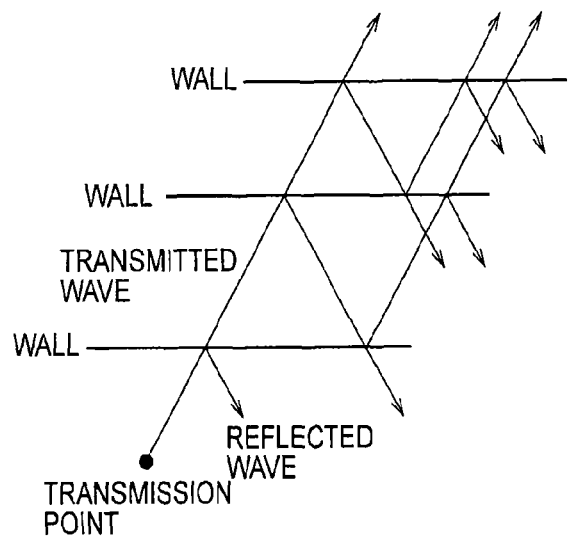
FIG. 2 shows a conventional method for obtaining the propagation path of a transmitted wave and a reflected wave.
Figure 3:
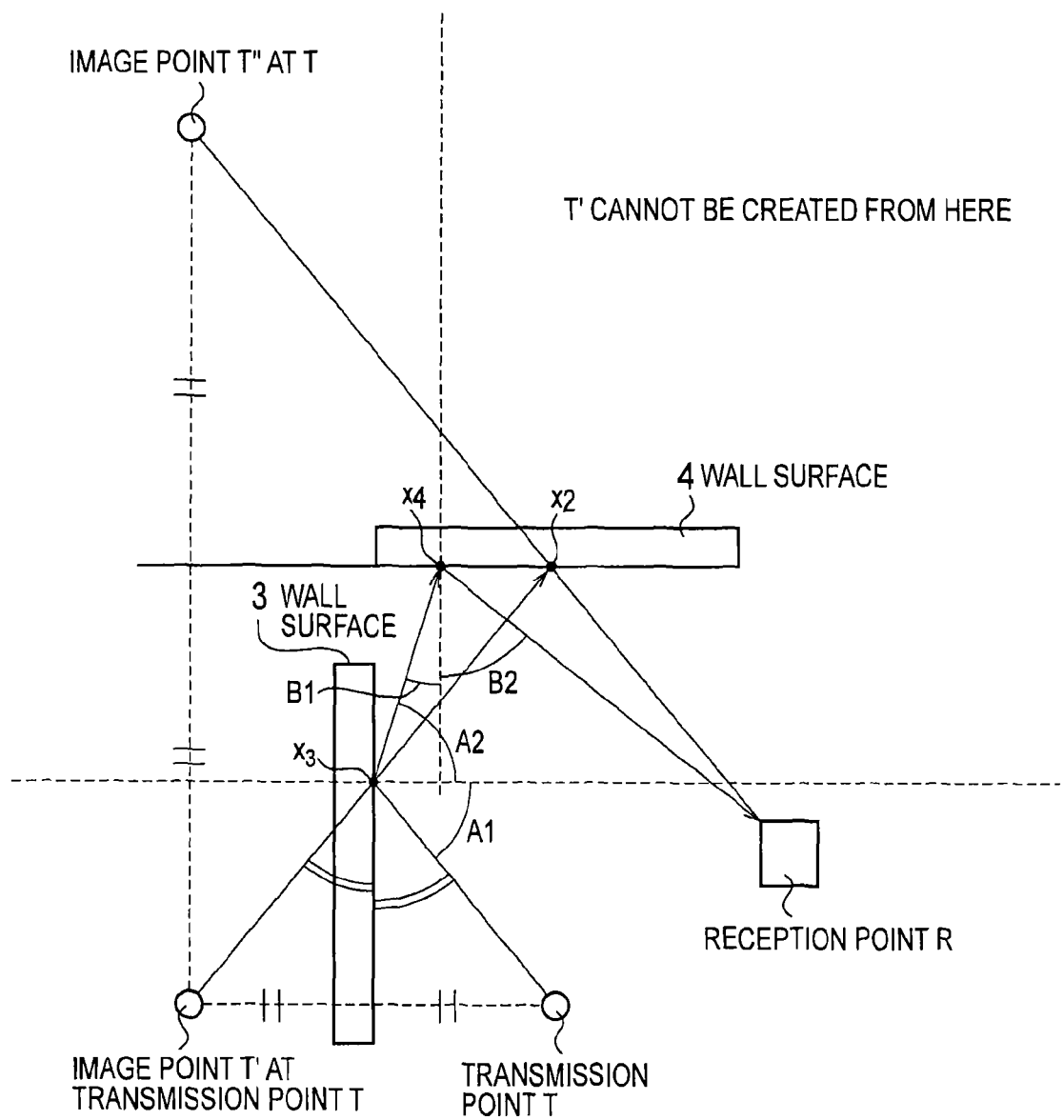
FIG. 3 is a diagram for explaining problems of the conventional method.
Figure 4:
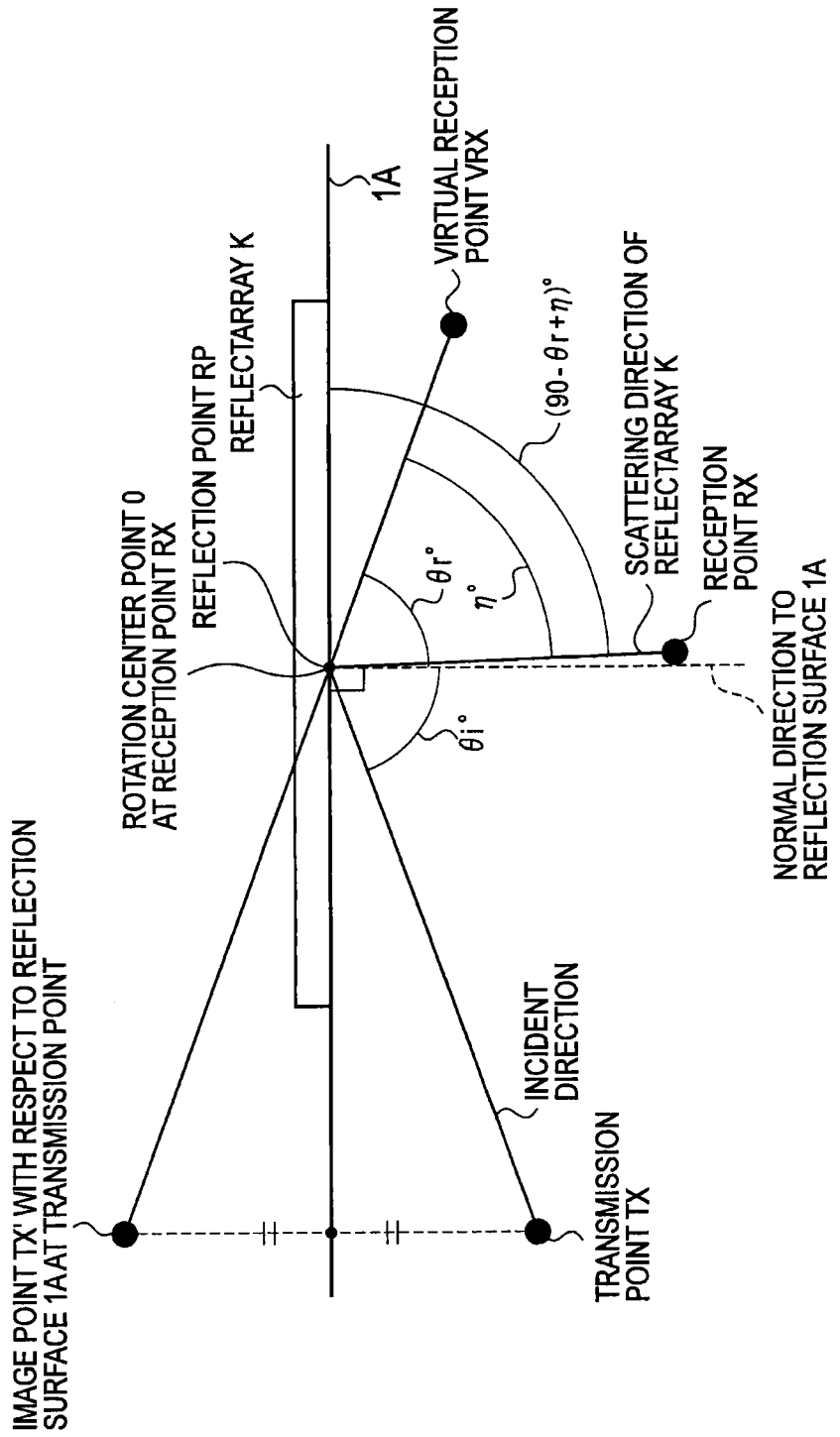
FIG. 4 is a diagram for explaining a propagation path estimation method according to a first embodiment of the present invention.

FIG. 4 shows an example in which radio wave incident from an incident direction $\theta_i^\circ$ to a reflectarray K scatters in a direction rotated by $\eta^\circ$ from a specular reflection direction $\theta_r^\circ$ of the reflectarray K toward a normal line to a reflection surface 1A of reflectarray K passing a reflection point RP.

In the present description, the incident direction is defined by the incident angle, and the reflection direction is defined by the reflection angle. In FIG. 4, $\theta_i^\circ = \theta_r^\circ$.

Figure 5:
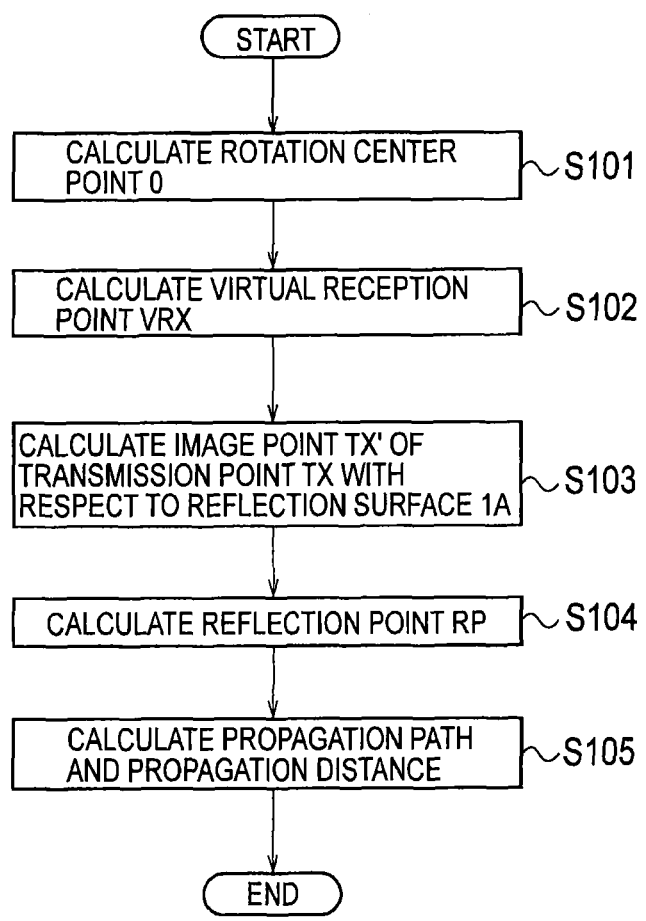
FIG. 5 is a flowchart for explaining the propagation path estimation method according to the first embodiment of the present invention.

In Step S101, any point on the reflection surface 1A of the reflectarray K is selected as a rotation center point O as shown in FIG. 4 and FIG. 5.

In Step S102, a virtual reception point VRX is calculated by rotating the reception point RX by $\eta^\circ$ about the rotation center point O toward a normal direction to the reflection surface 1A of the reflectarray K passing a reflection point RP.

In Step S103, an image point TX' of a transmission point TX with respect to the reflection surface 1A (structure) of the reflectarray K is calculated using an imaging method.

In Step S104, the image point TX' and the virtual reception point VRX are connected to each other with a straight line, and a point where the straight line and the reflection surface 1A of the reflectarray K intersect to each other is assumed as a reflection point RP.

In Step S105, the propagation path and the propagation distance are calculated by connecting the transmission point TX, the reflection point RP and the reception point RX to one another with a straight line.

Second Embodiment of the Present Invention

Next, a propagation path estimation method according to a second embodiment of the present invention is described with reference to FIG. 6. Hereinafter, the propagation path estimation method according to the present embodiment is described by focusing on a difference thereof from a propagation path estimation method according to the first embodiment described above.

Figure 6:
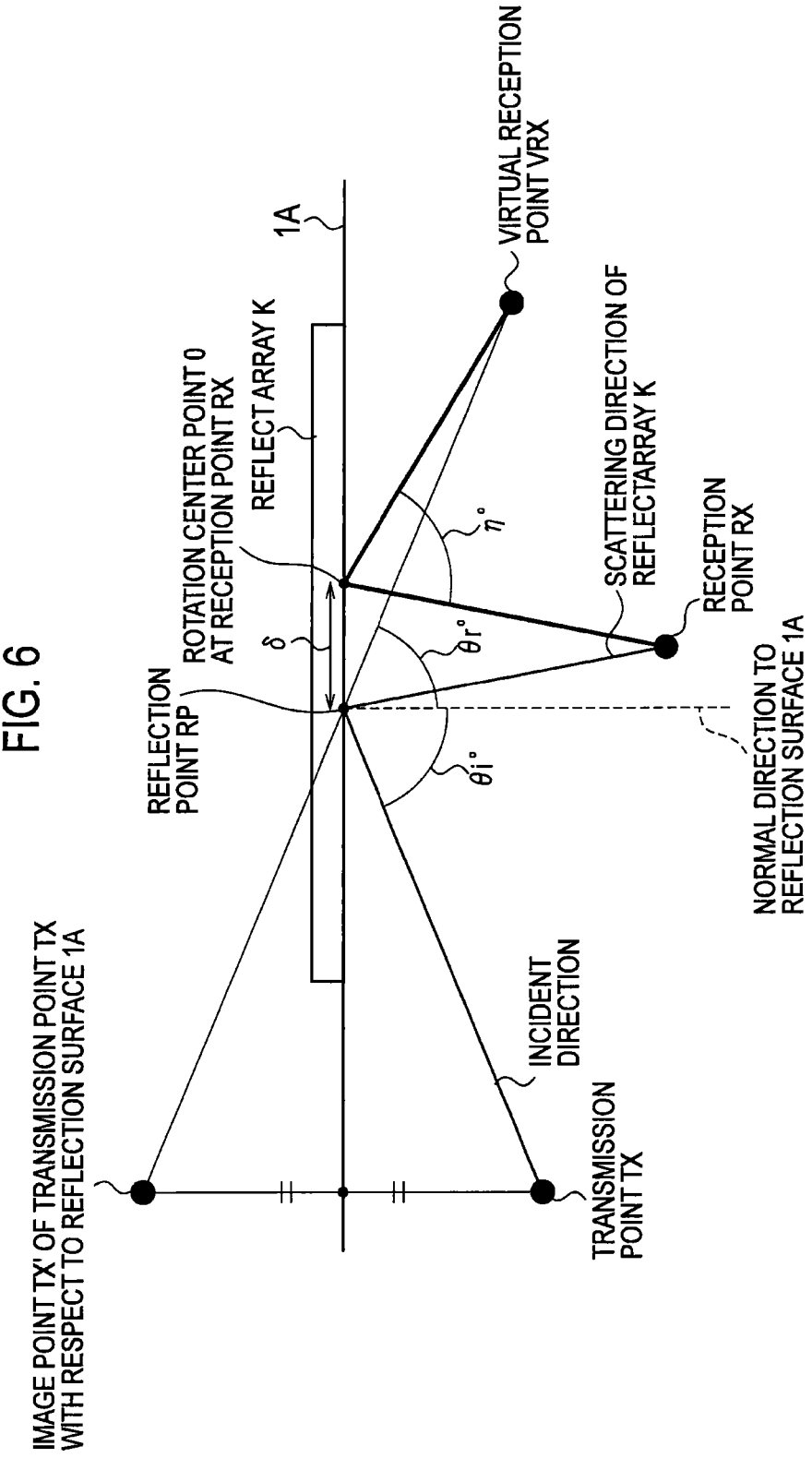
FIG. 6 is a diagram for explaining a propagation path estimation method according to a second embodiment of the present invention.

As shown in FIG. 6, when the reflection point RP and the rotation center point O calculated by the propagation path estimation method according to the first embodiment do not match each other, the reception point RX deviates by η° from the specular reflection direction (normal reflection direction) about the rotation center point O, whereby a calculation error occurs.

Therefore, the propagation path estimation method according to the present embodiment repeats Steps S101 to S104 of the propagation path estimation method according to the first embodiment (see FIG. 5) by changing the rotation center point O by a specific distance (for example, O−|RP−O|) until a distance between the reflection point RP and the rotation center point O becomes a predetermined distance (for example, δ) or less.

Third Embodiment of the Present Invention

A propagation path estimation method according to a third embodiment of the present invention is described with reference to FIG. 7 to FIG. 9. Hereinafter, the propagation path estimation method according to the present embodiment is described by focusing on a difference thereof from a propagation path estimation method according to the first or the second embodiment described above.

Figure 7:
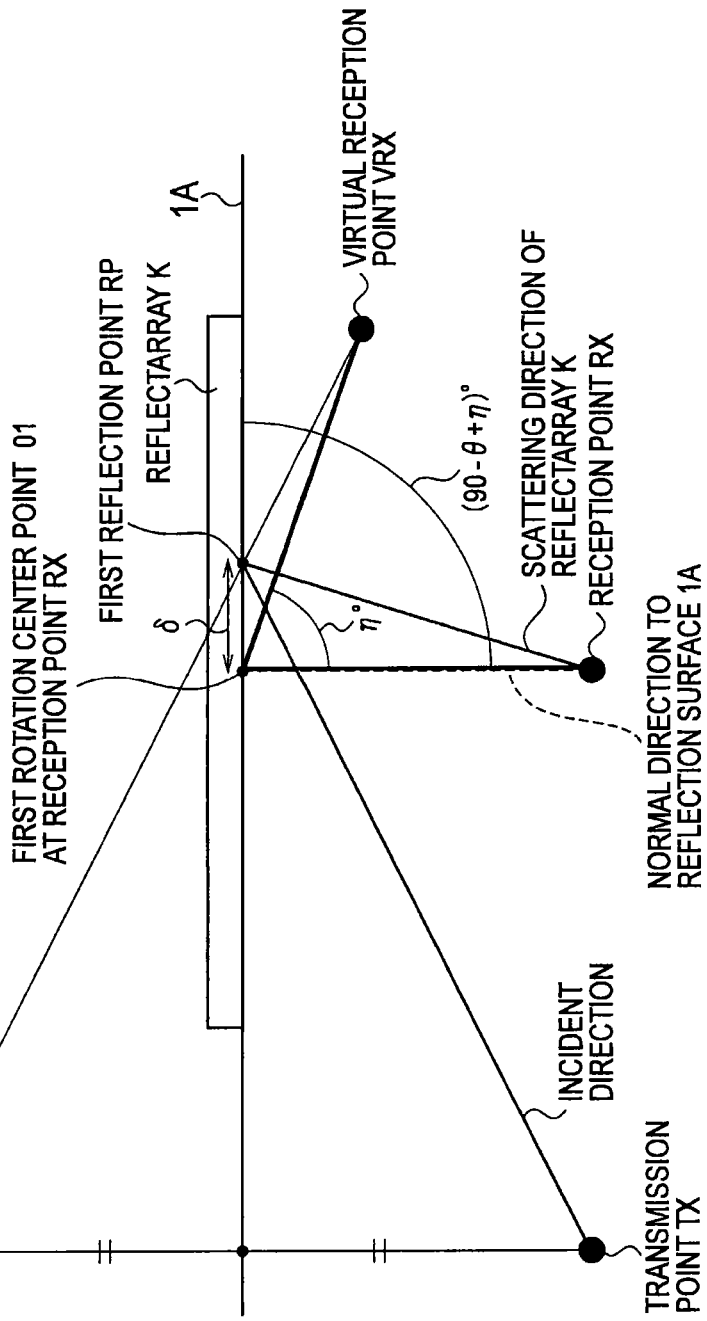
FIG. 7 is a diagram for explaining a propagation path estimation method according to a third embodiment of the present invention.
Figure 8:
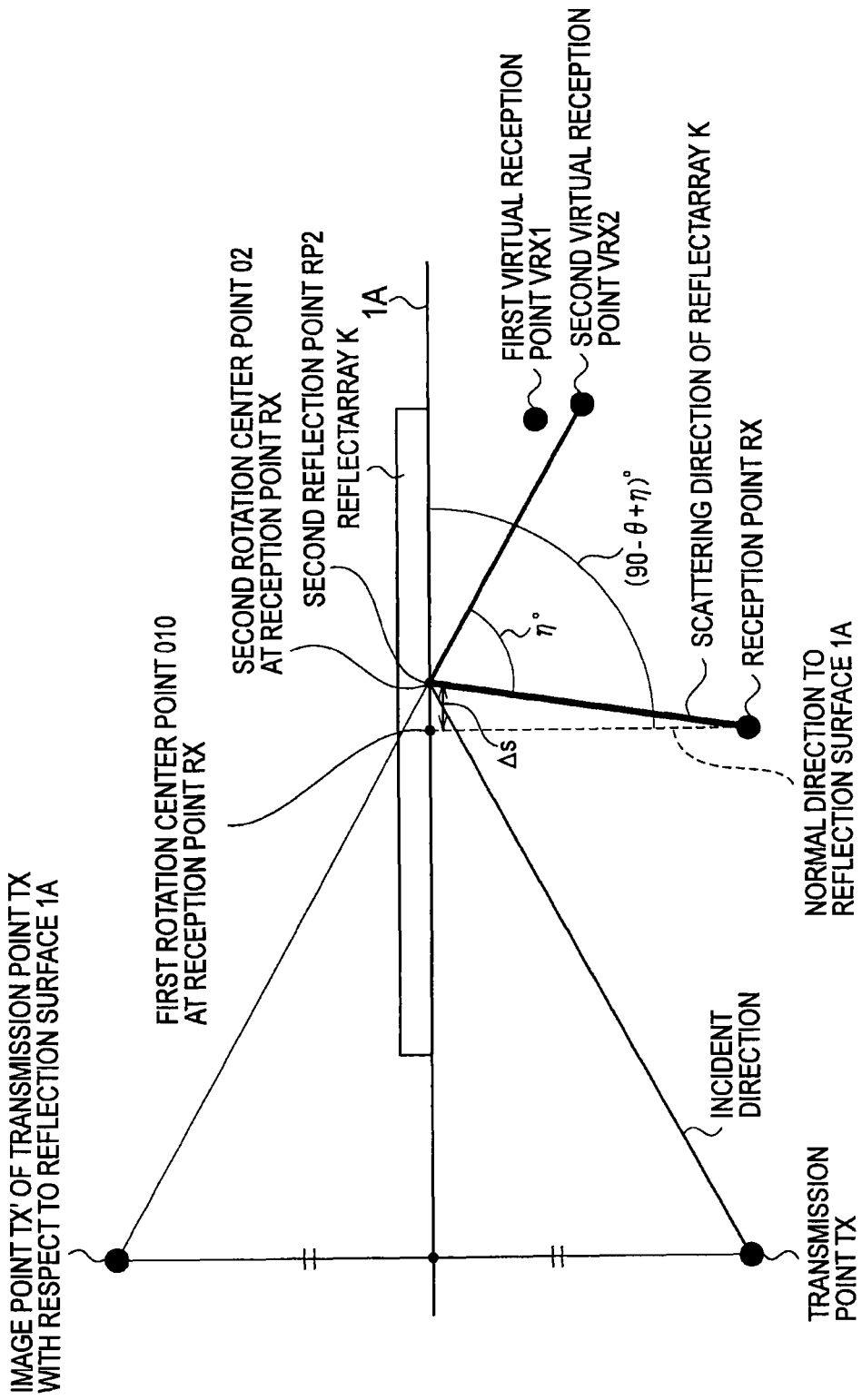
FIG. 8 is a diagram for explaining the propagation path estimation method according to the third embodiment of the present invention.
Figure 9:
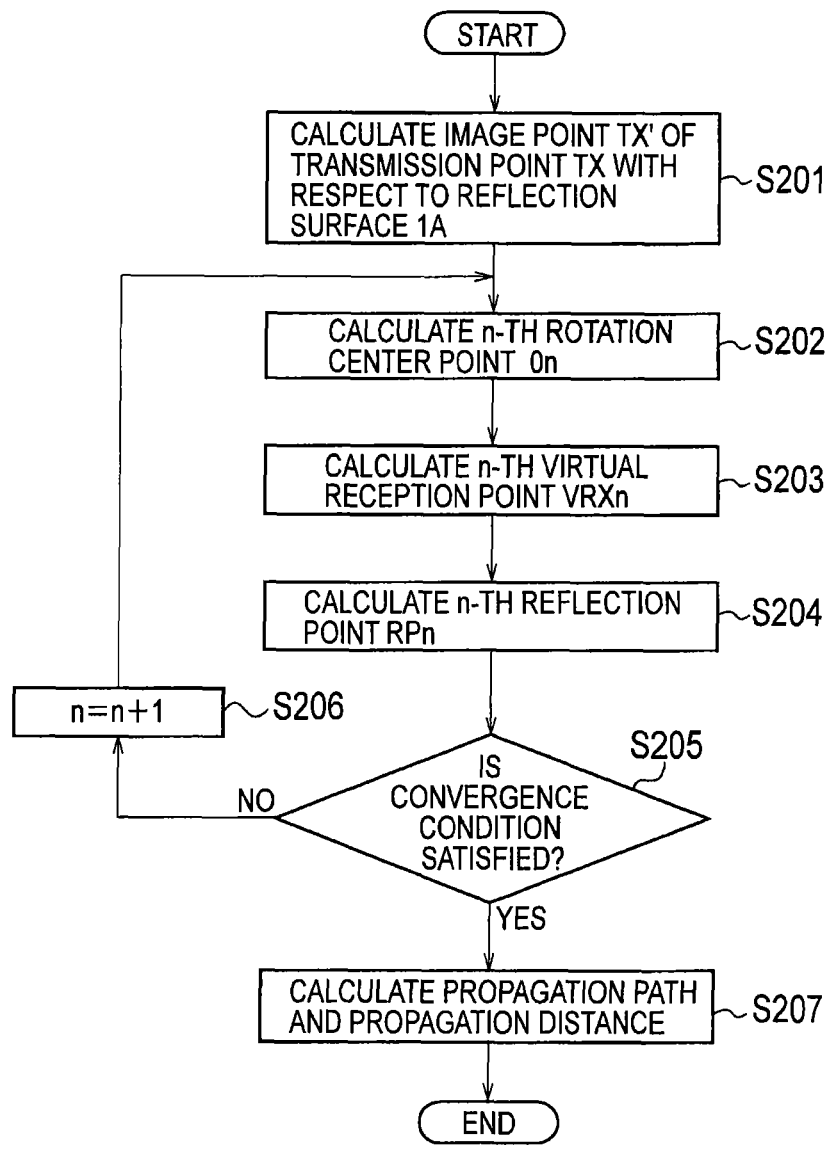
FIG. 9 is a flowchart for explaining the propagation path estimation method according to the third embodiment of the present invention.

In Step S201, the image point TX' of the transmission point TX with respect to the reflection surface 1A (structure) of the reflectarray K is calculated using the imaging method as shown in FIG. 7 to FIG. 9.

In Step S202, an n-th rotation center point $O_n$ is calculated. Here, default of "n" is "1." For example, a first rotation center point $O_1$ is a point where a normal line to the reflection surface 1A passing the reception point RX and the reflection surface 1A intersect to each other, and an n-th rotation center point $O_n$ is a point to which a (n−1)th rotation center point $O_{n-1}$ is shifted by Δs.

In Step S203, an n-th virtual reception point VRXn is calculated by rotating the reception point RX by η° about the rotation center point $O_n$ toward a normal line to the reflection surface 1A of the reflectarray K passing the rotation center point $O_n$.

In Step S204, the image point TX' and an n-th virtual reception point VRXn are connected to each other with a straight line, and a point where the straight line and the reflection surface 1A of the reflectarray K intersect to each other is assumed as an n-th reflection point RPn.

In Step S205, it is determined whether or not the convergence condition is satisfied. For example, when a distance between the n-th rotation center point $O_n$ and the n-th reflection point RPn is shorter than a threshold value Δs, it may be determined that the convergence condition is satisfied.

When determined that the convergence condition is satisfied, the process proceeds to Step S207. When determined that the convergence condition is not satisfied, the process increments "n" just by "1" in Step S206 and returns to Step S202.

In Step S207, the propagation path and the propagation distance are calculated by connecting the transmission point TX, the n-th reflection point RPn and the reception point RX to one another with a straight line.

Fourth Embodiment of the Present Invention

Figure 10:
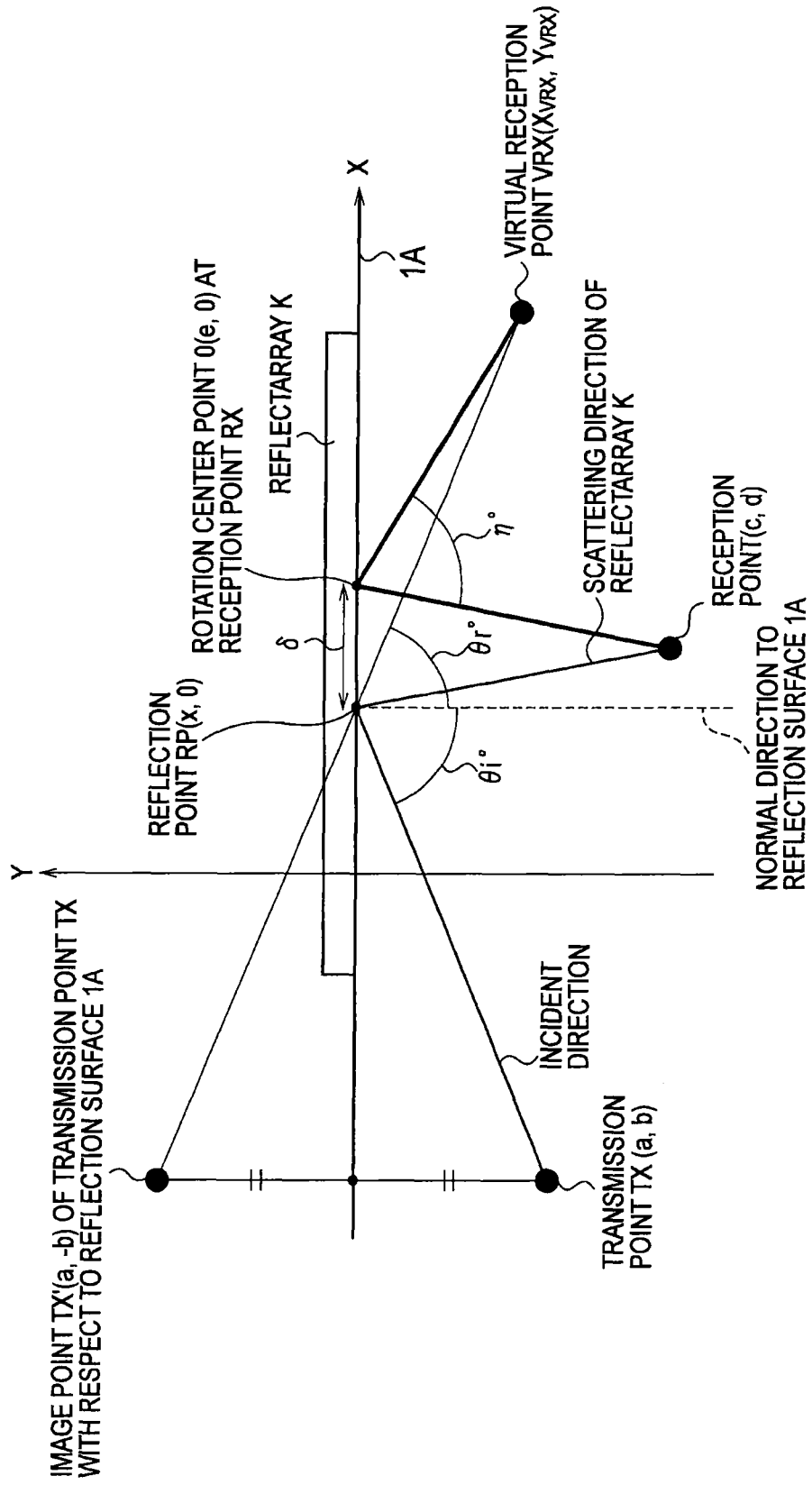
FIG. 10 is a diagram for explaining a propagation path estimation method according to a fourth embodiment of the present invention.

A propagation path estimation method according to a fourth embodiment of the present invention is described with reference to FIG. 10. Hereinafter, the propagation path estimation method according to the present embodiment is described by focusing on a difference thereof from propagation path estimation methods according to the first to the third embodiments described above.

In the propagation path estimation method according to the present embodiment, an orthogonal coordinate system having the X axis direction in a direction of the reflection surface 1A of the reflectarray K and the Y axis direction in a direction orthogonal to the reflection surface 1A.

The coordinates of respective points are as follows:
The coordinates of the transmission point TX: (a, b)
The coordinates of the image point TX' with respect to the reflection surface 1A of the transmission point TX: (a, −b)
The coordinates of the reception point RX: (c, d)
The coordinates of the rotation center point O: (e, 0)
The coordinates of the virtual reception point VRX: (Xvrx, Yvrx)=(cos(−η°)×(c−e)−sin(−η°)×d+e, sin(−η°)×(c−e)+cos(−η°)×d)

An equation of a straight line passing $(x_1, y_1)$ and $(x_2, y_2)$ can be expressed as follows:

$$y - y_1 = \frac{y_2 - y_1}{x_2 - x_1}(x - x_1) \qquad \text{[Math 1]}$$

Therefore, an equation of the straight line passing the image point TX' and the virtual reception point VRX is expressed by "y−(−b)=((sin(−η°)×(c−e)+cos(−η°)×d−a)/(cos(−η°)×(c−e)−sin(−η°)×d−(−b))+e)×(x−a)."

Here, by substituting "y=0," a value "x" of the x coordinate of the intersection point can be calculated. (x, 0) are the coordinates of the reflection point RP.

Accordingly, to have the rotation center point O and the reflection point RP match each other, "e=x" is substituted in the above equation. That is, the coordinates of the reflection point RP can be calculated by calculating a value x from the equation "x=b/{((sin(−η°)×(c−x)+cos(−η°)×d−a)/(cos(−η°)×(c−x)−sin(−η°)×d−(−b))+x)}+a."

Fifth Embodiment of the Present Invention

A propagation path estimation method according to a fifth embodiment of the present invention is described with reference to FIG. 11 and FIG. 12. Hereinafter, the propagation path estimation method according to the present embodiment is described by focusing on a difference thereof from propagation path estimation methods according to the first to the fourth embodiments described above.

Figure 11:
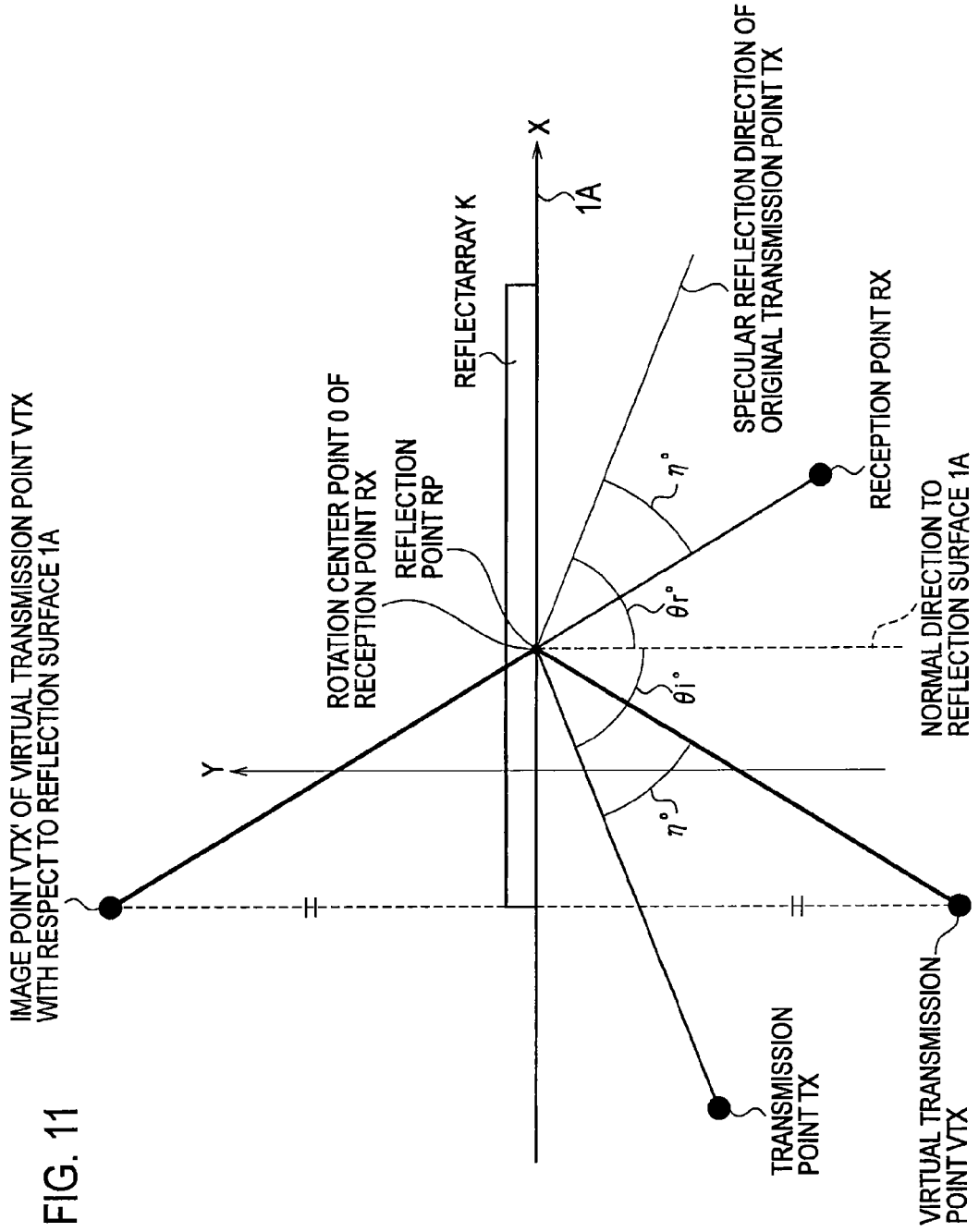
FIG. 11 is a diagram for explaining a propagation path estimation method according to a fifth embodiment of the present invention.
Figure 12:
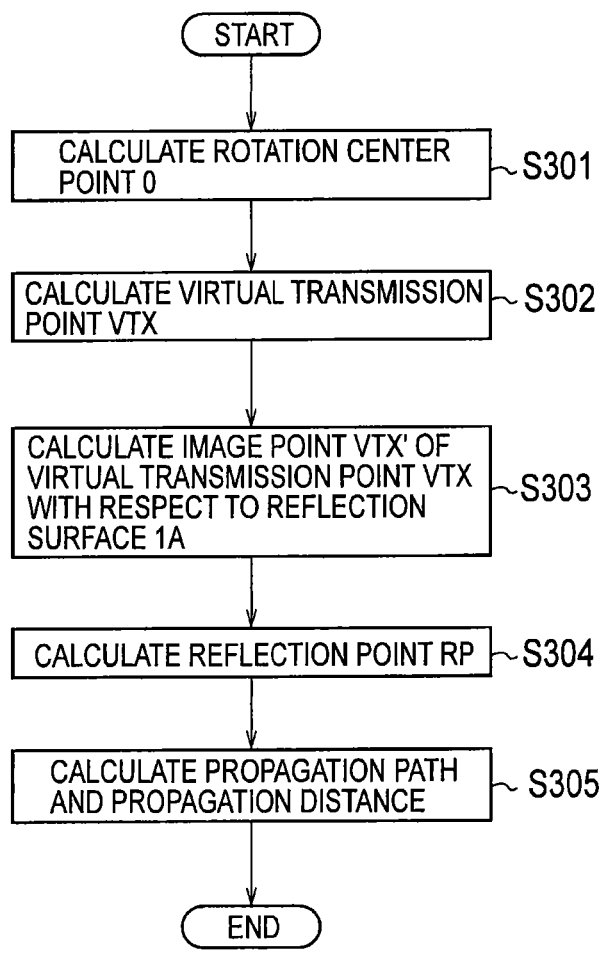
FIG. 12 is a flowchart for explaining the propagation path estimation method according to the fifth embodiment of the present invention.

In Step S301, any point on the reflection surface 1A of the reflectarray K is selected as a rotation center point O as shown in FIG. 11 and FIG. 12.

In Step S302, a virtual transmission point VTX is calculated by rotating the transmission point TX by η° about the rotation center point O toward a normal line to the reflection surface 1A of the reflectarray K passing the rotation center O.

In Step S303, an image point VTX' of the virtual transmission point VTX with respect to the reflection surface 1A of the reflectarray K is calculated using the imaging method.

In Step S304, the image point VTX' and the reception point RX are connected to each other with a straight line, and a point where the straight line and the reflection surface 1A of the reflectarray K intersect to each other is assumed as a reflection point RP.

In Step S305, the propagation path and the propagation distance are calculated by connecting the transmission point TX, the reflection point RP and the reception point RX to one another with a straight line.

Sixth Embodiment of the Present Invention

A propagation path estimation method according to a sixth embodiment of the present invention is described with reference to FIG. 13 to FIG. 15. Hereinafter, the propagation path estimation method according to the present embodiment is described by focusing on a difference thereof from propagation path estimation methods according to the first to the fifth embodiments described above.

Figure 13:
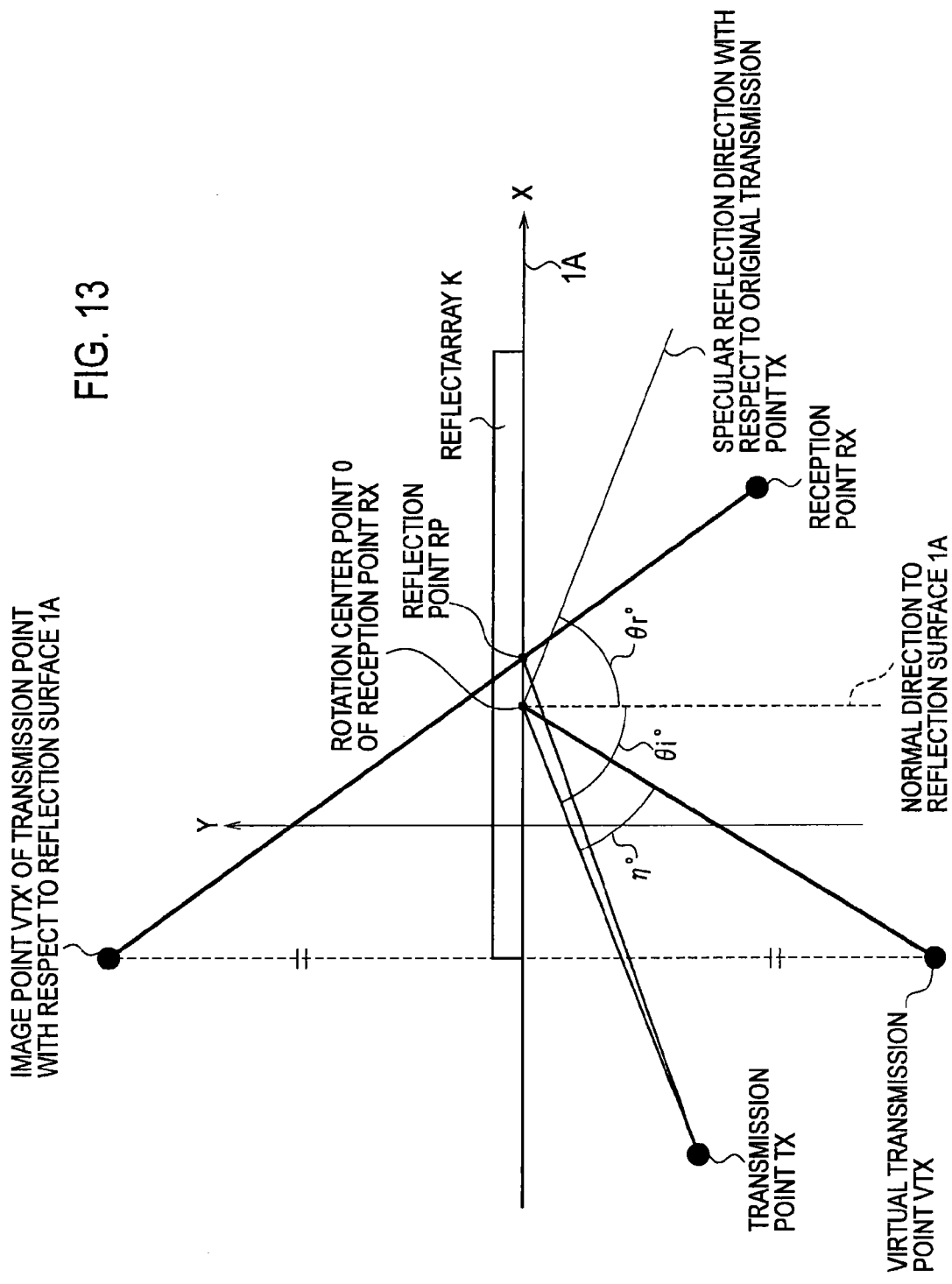
FIG. 13 is a diagram for explaining a propagation path estimation method according to a sixth embodiment of the present invention.

As shown in FIG. 13, when the reflection point RP and the rotation center point O calculated by a propagation path estimation method according to the fifth embodiment do not match each other, a calculation error occurs.

Therefore, the propagation path estimation method according to the present embodiment repeats steps of a propagation path estimation method according to the fifth embodiment (see FIG. 12) by changing the rotation center point O by a specific distance (for example, O−|RP−O| or Δs) until a distance between the reflection point RP and the rotation center point O becomes a predetermined distance (for example, δ or Δs) or less.

Figure 14:
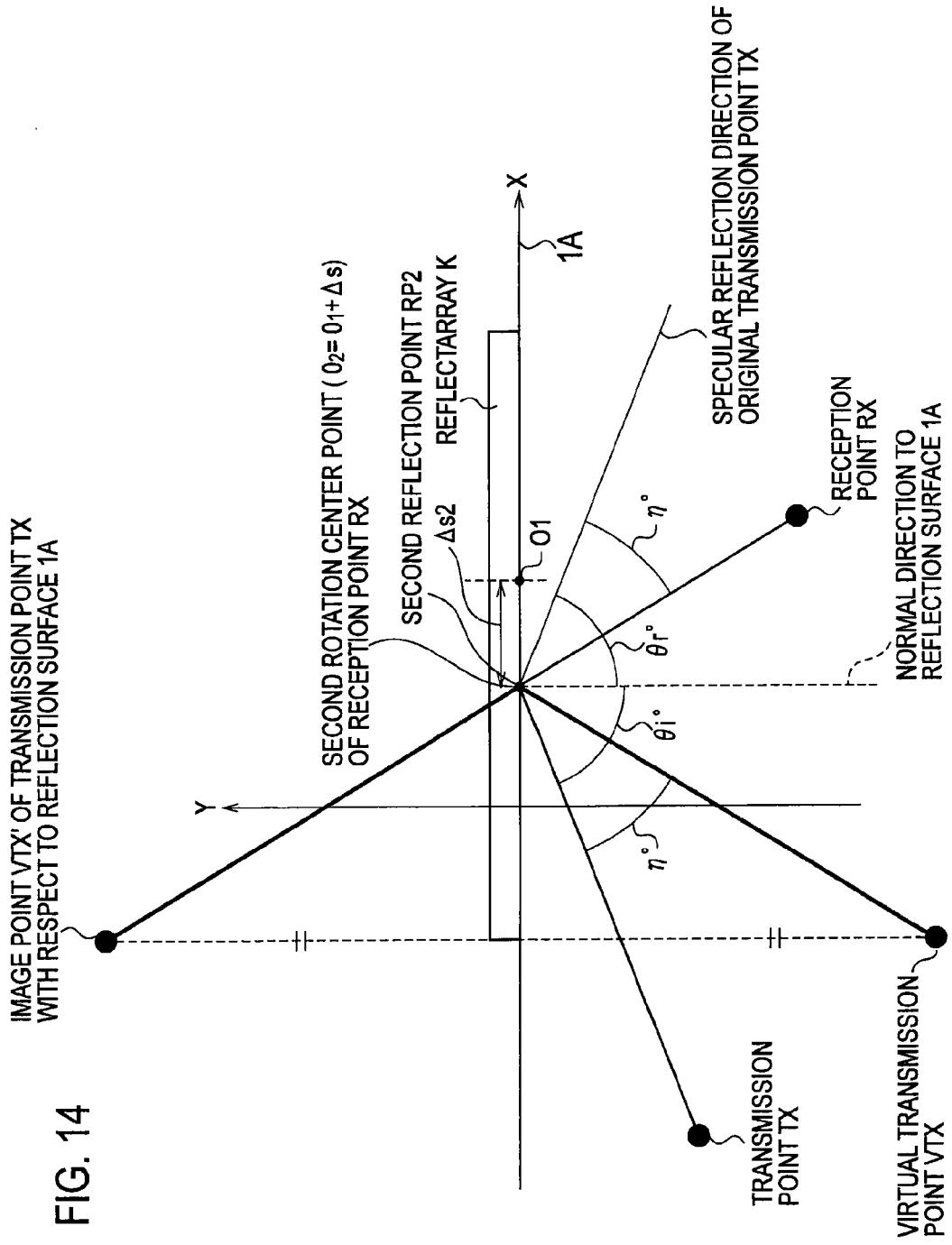
FIG. 14 is a diagram for explaining the propagation path estimation method according to the sixth embodiment of the present invention.
Figure 15:
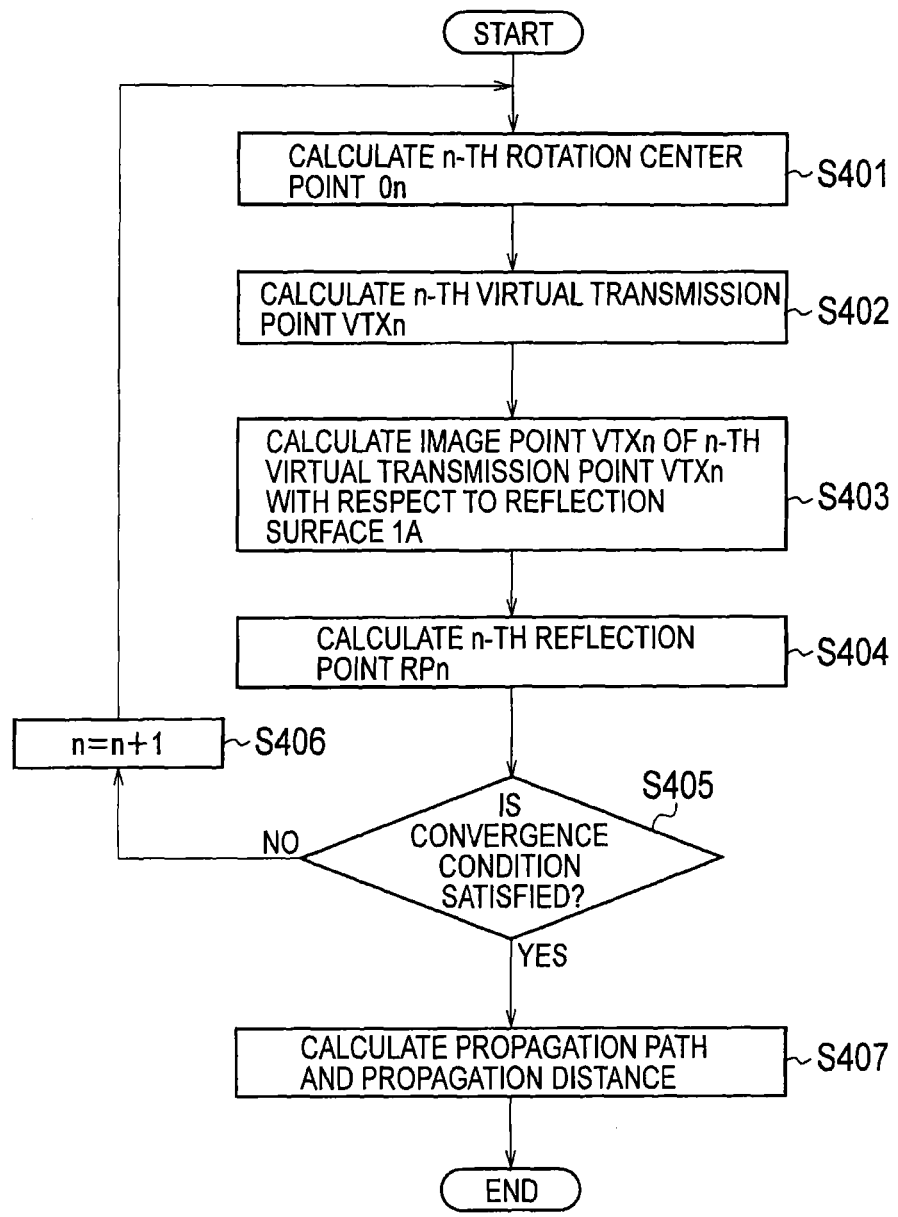
FIG. 15 is a flowchart for explaining the propagation path estimation method according to the sixth embodiment of the present invention.

Specifically, an n-th rotation center point $O_n$ is calculated in Step S401 as shown in FIG. 14 and FIG. 15. Here, default of "n" is "1." For example, a first rotation center point $O_1$ is a point where a normal line to the reflection surface 1A passing the reception point RX and the reflection surface 1A intersect to each other, and an n-th rotation center point $O_n$ is a point to which an (n−1)th rotation center point $O_{n-1}$ is shifted just by Δs.

In Step S402, an n-th virtual transmission point VTXn is calculated by rotating the transmission point TX by η° about the rotation center $O_n$ toward a normal line to the reflection surface 1A of the reflectarray K passing the rotation center point $O_n$.

In Step S403, an image point VTX'n of an n-th virtual transmission point VTXn with respect to the reflection surface 1A of the reflectarray K is calculated using the imaging method.

In Step S404, the image point VTX'n and the reception point RX are connected to each other with a straight line, and a point where the straight line and the reflection surface 1A of the reflectarray K intersect to each other is assumed as an n-th reflection point RPn.

In Step S405, it is determined whether or not the convergence condition is satisfied. For example, when the distance between an n-th rotation center point $O_n$ and an n-th reflection point RPn is shorter than a threshold value δ or Δs, it may be determined that the convergence condition is satisfied.

When determined that the convergence condition is satisfied, the process proceeds to Step S407. When determined that the convergence condition is not satisfied, the process increments "n" just by "1" in Step S406 and returns to Step S401.

In Step S407, the propagation path and the propagation distance are calculated by connecting the transmission point TX, the n-th reflection point RPn and the reception point RX to one another with a straight line.

Seventh Embodiment of the Present Invention

Figure 16:
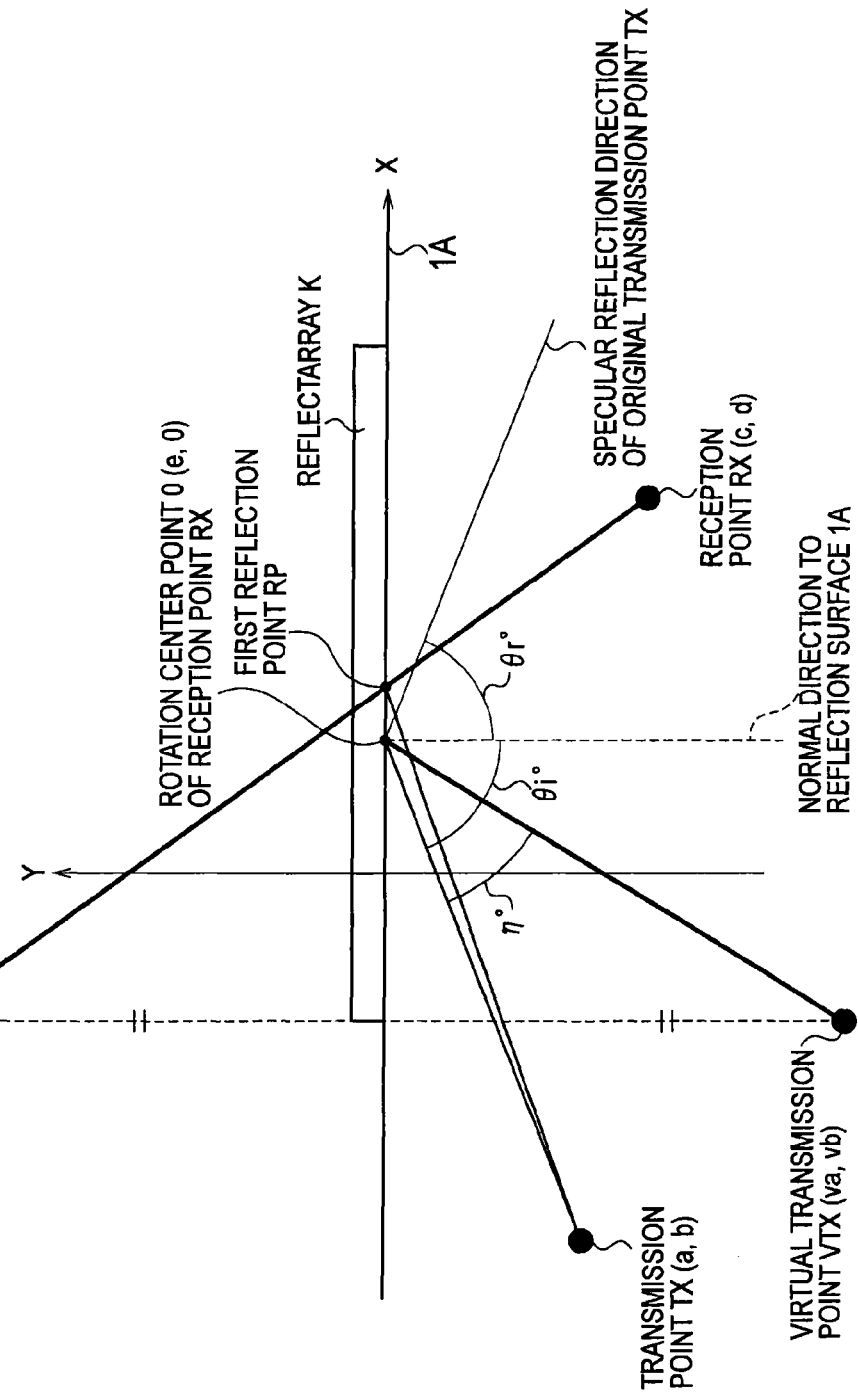
FIG. 16 is a diagram for explaining a propagation path estimation method according to a seventh embodiment of the present invention.

A propagation path estimation method according to a seventh embodiment of the present invention is described with reference to FIG. 16. Hereinafter, the propagation path estimation method according to the present embodiment is described by focusing on a difference thereof from propagation path estimation methods according to the first to the sixth embodiments described above.

In the propagation path estimation method according to the present embodiment, an orthogonal coordinate system having the X axis direction in a direction of the reflection surface 1A of the reflectarray K and the Y axis direction in a direction orthogonal to the reflection surface 1A is used.

Coordinates of respective points are as follows:
Coordinates of transmission point TX: (a, b)
Coordinates of reception point RX: (c, d)
Coordinates of rotation center point O: (e, 0)
Virtual transmission point VTX: (va, vb)=(cos(η°)×(a−e)−sin(η°)×b+e, sin(η°)×(a−e)+cos(η°)×b)
Coordinates of image point VTX' of virtual transmission point VTX with respect to reflection surface 1A: (va, −vb)

Accordingly, an equation of a straight line passing the image point VTX' and the reception point VRX is expressed by "y−(−b)=((sin(η°)×(a−e)+cos(η°)×b−va)/(cos(η°)×(a−e)−sin(−η°)×(d−(−vb))+e)×(x−va)."

Here, by substituting "y=0," a value "x" of the x coordinate of the intersection point can be calculated. (x, 0) are the coordinates of the reflection point RP.

Accordingly, to have the rotation center point O and the reflection point RP match each other, "e=x" is substituted in the above equation. That is, the coordinates of the reflection point RP can be calculated by calculating a value x from the equation "x=b/{((sin(−η°)×c+cos(−η°)×d−a)/(cos(−η°)×c−sin(−η°)×d−(−b))+x)}+a."

Eighth Embodiment of the Present Invention

A propagation path estimation method according to an eighth embodiment of the present invention is described with reference to FIG. 17. Hereinafter, the propagation path estimation method according to the present embodiment is described by focusing on a difference thereof from propagation path estimation methods according to the first to the seventh embodiments described above.

Figure 17:
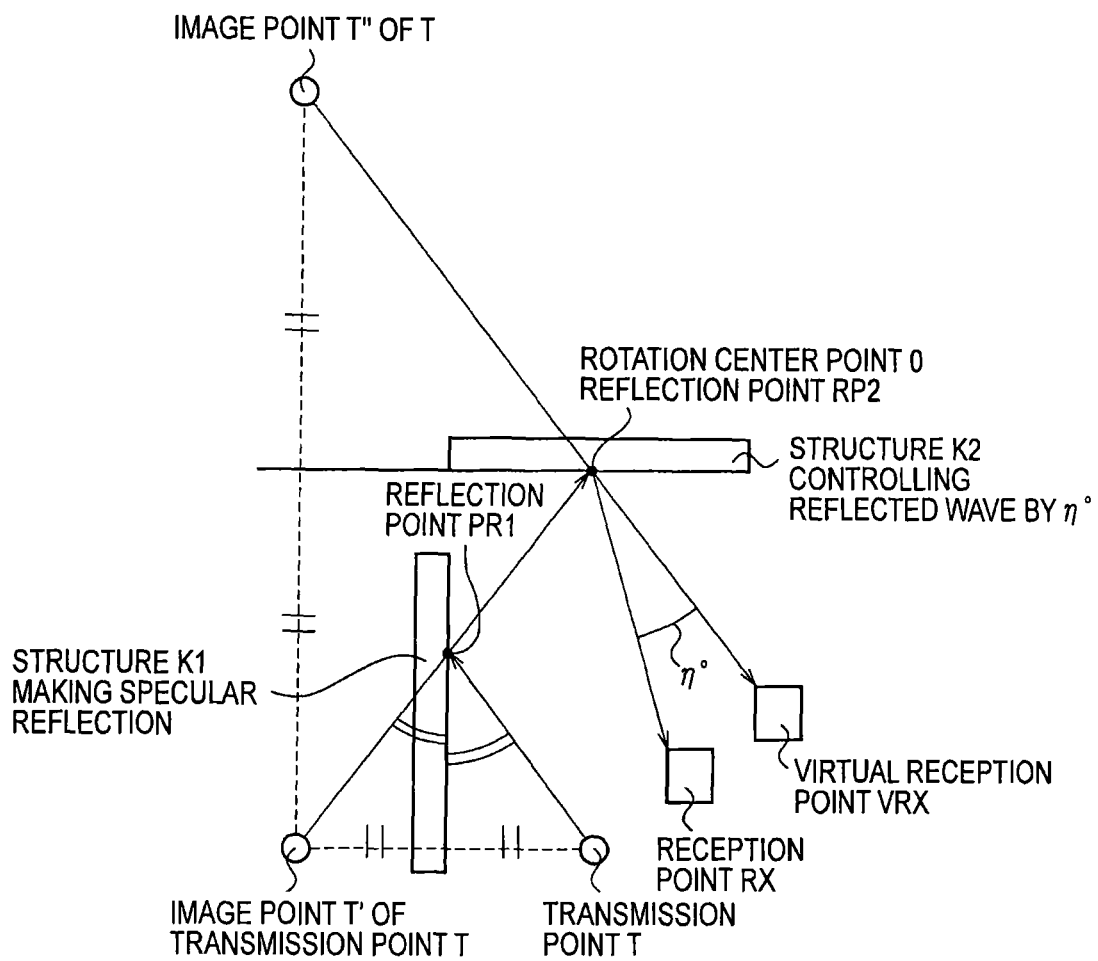
FIG. 17 is a diagram for explaining a propagation path estimation method according to an eighth embodiment of the present invention.

As shown in FIG. 17, the propagation path estimation method according to the present embodiment is applied to a case where radio wave in a propagation path is reflected or scattered by a structure K1 (first structure) which reflects and scatters the radio wave in a different direction (θ−η)° from the specular reflection direction θ° and thereafter is reflected or scattered by a structure K2 (second structure) which reflects and scatters the radio wave in the specular reflection direction θ°.

The propagation path estimation method according to the present embodiment is performed in the following steps:

In the first step, using the imaging method, a first image point TX' of the transmission point TX with respect to the structure K1 is calculated, and a second image point TX" of the first image point TX' with respect to the structure K2 is calculated.

In the second step, a virtual reception point VRX is calculated by rotating the reception point RX by η° about the rotation center point O in a direction opposite to a normal line to the reflection surface 1A of the reflectarray K passing the rotation center point O. In the third step, the second image point TX" and the virtual reception point VRX are connected to each other with a straight line, and a point where the straight line and the structure K2 intersect with each other is assumed as a reflection point RP2. Then, the first image point TX' and the reflection point RP2 are connected to each other with a straight line, and a point where the straight line and the structure K1 intersect with each other is assumed as a reflection point RP1.

In the fourth step, the propagation path and the propagation distance are calculated by connecting the transmission point TX, the reflection point RP1, the reflection point RP2 and the reception point RX to one another with a straight line.

When the convergence condition is not satisfied (for example, when a distance between the rotation center point O and the reflection point RP2 is not shorter than a predetermined distance), the above steps may be repeated by shifting the rotation center point O until the convergence condition is satisfied.

Ninth Embodiment of the Present Invention

A propagation path estimation method according to a ninth embodiment of the present invention is described with reference to FIG. 18. Hereinafter, the propagation path estimation method according to the present embodiment is described by focusing on a difference thereof from a propagation path estimation methods according to the first to the eighth embodiments described above.

Figure 18:
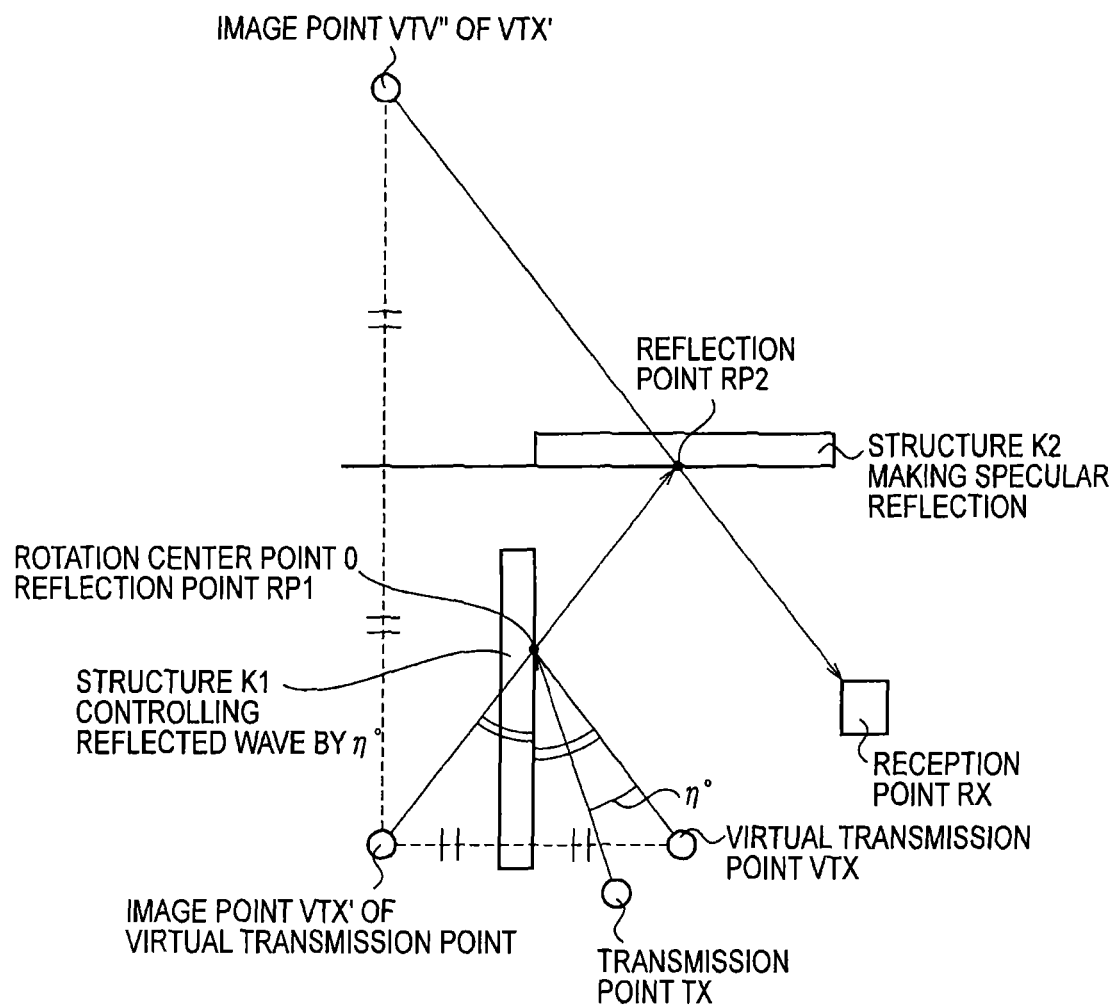
FIG. 18 is a diagram for explaining a propagation path estimation method according to a ninth embodiment of the present invention.

As shown in FIG. 18, the propagation path estimation method according to the present embodiment is applied to a case where radio wave in a propagation path is reflected or scattered by a structure K1 (first structure) which reflects and scatters the radio wave in the specular reflection direction $\theta°$ and thereafter is reflected or scattered by a structure K2 (second structure) which reflects and scatters the radio wave in a different direction $(\theta-\eta)°$ from the specular reflection direction $\theta°$.

The propagation path estimation method according to the present embodiment is performed in the following steps:

In the first step, a virtual transmission point VTX is calculated by rotating the transmission point TX by $\eta°$ toward a normal line to the reflection surface 1A of the reflectarray K passing the rotation center point O, about the rotation center point O.

In the second step, using the imaging method, a first image point VTX' of the virtual transmission point VTX with respect to the structure K1 is calculated, and a second image point VTX' of the first image point VTX" with respect to the structure K2 is calculated.

In the third step, the second image point VTX" and the reception point RX are connected to each other with a straight line, and a point where the straight line and the structure K2 intersect with each other is assumed as RP2. Then, the first image point VTX' and the reflection point RP2 are connected to each other with a straight line, and a point where the straight line and the structure K1 intersect with each other is assumed as the reflection point RP1.

In the fourth step, the propagation path and the propagation distance are calculated by connecting the transmission point TX, the reflection point RP1, the reflection point RP2 and the reception point RX to one another with a straight line.

When the convergence condition is not satisfied (for example, when a distance between the rotation center point O and the reflection point RP1 is not shorter than a predetermined distance), the above steps may be repeated by shifting the rotation center point O until the convergence condition is satisfied.

Tenth Embodiment of the Present Invention

A propagation path estimation method according to a tenth embodiment of the present invention is described with reference to FIG. 19. Hereinafter, the propagation path estimation method according to the present embodiment is described by focusing on a difference thereof from a propagation path estimation method according to the first embodiment described above.

Figure 19:
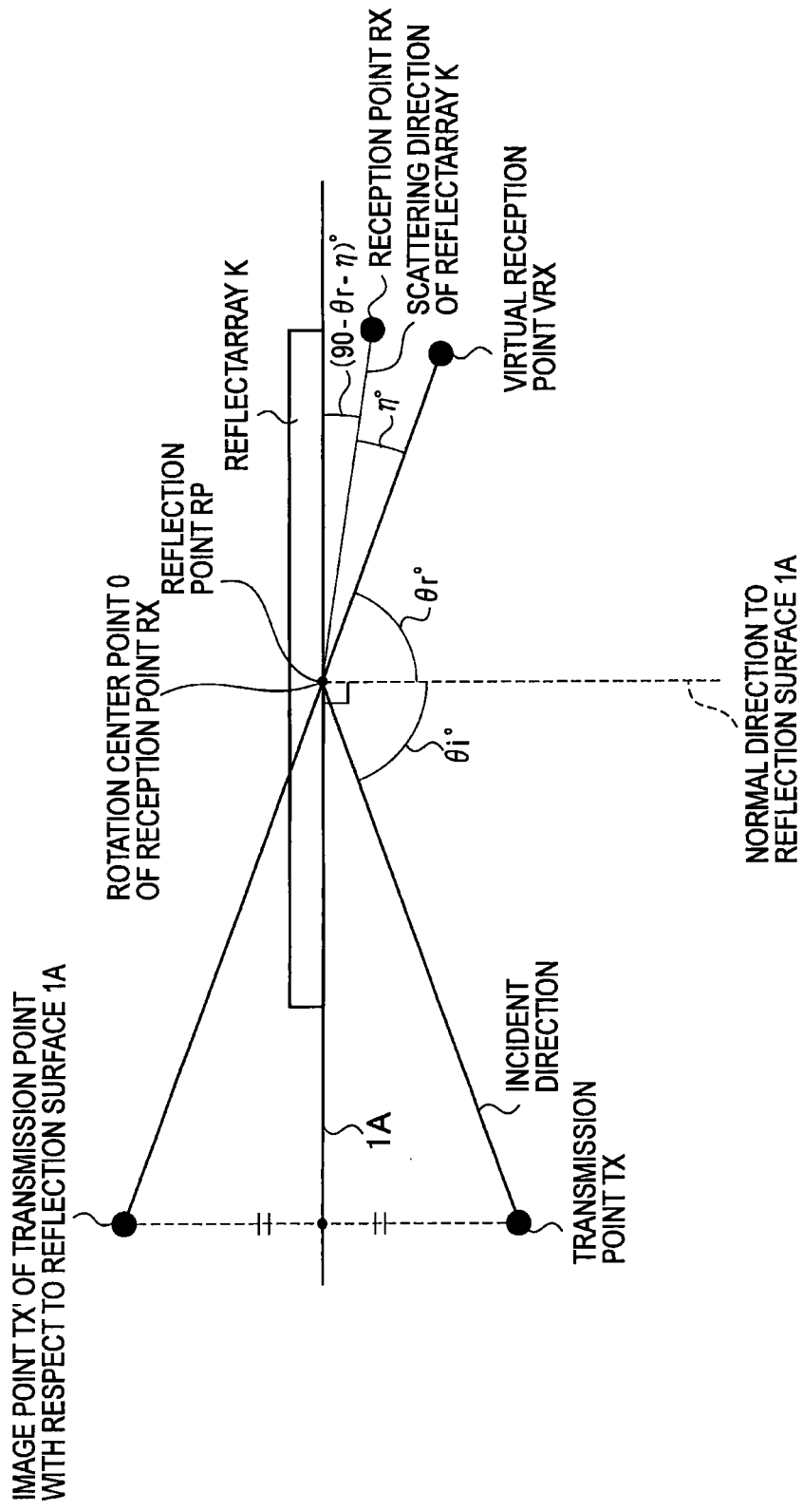
FIG. 19 is a diagram for explaining a propagation path estimation method according to a tenth embodiment of the present invention.

In the propagation path estimation method according to the present embodiment, the rotational angle $\eta°$ may be a negative value as shown in FIG. 19.

That is, in the propagation path estimation method according to the present embodiment, the virtual reception point VRX can be calculated by rotating the reception point RX by $\eta°$ in a direction opposite to the normal line to the reflection surface 1A of the reflectarray K passing the reflection point RP, about the rotation center point O.

Further, similarly, in a propagation path estimation method according to the fifth embodiment, the rotational angle $\eta°$ may be a negative value. Alternatively, $\eta°$ may be a function of the incident angle $\theta$. That is, in the propagation path estimation method according to the fifth embodiment, the virtual reception point VTX can be calculated by rotating the transmission point TX by $\eta°$ in a direction opposite to the normal line to the reflection surface 1A of the reflectarray K passing the reflection point RP, about the rotation center point O.

Further, in the propagation path estimation method according to the above embodiment, the virtual reception point VRX, the virtual transmission point VTX, the rotation center point O, and the reflection point RP can be obtained per the propagation path.

In the above embodiments, $\eta°$ is not limited to a fixed value, but may be, for example, a value varying according to the incident angle $\theta_i$.

Eleventh Embodiment of the Present Invention

A propagation path estimation method according to an eleventh embodiment of the present invention is described with reference to FIG. 20 to FIG. 26. In the present embodiment, a calculation example of the propagation path estimation method is described by using specific values.

Figure 20:
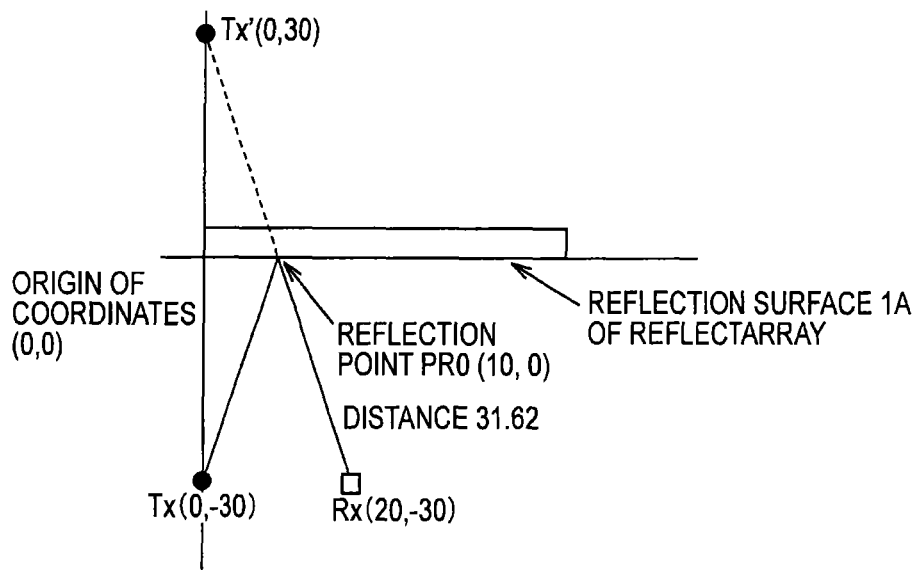
FIG. 20 is a diagram for explaining a propagation path estimation method according to an eleventh embodiment of the present invention (before rotation of reception point).

FIG. 20 is a diagram illustrating a method for obtaining a reflection point with respect to the reflection surface 1A of the reflectarray, showing two-dimensional coordinates with one end of the reflection surface 1A of the reflectarray as an origin (0, 0). Assuming that the coordinates of a transmission point Tx are (0, −30) and the coordinates of a reception point Rx are (20, −30), an image point Tx' of the transmission point Tx with respect to the reflection surface 1A of the reflectarray is created. On this basis, the coordinates of Tx' are (0, 30), and the coordinates of an intersection point PR1 with the reflection surface 1A of the reflectarray is (10, 0).

Figure 21:
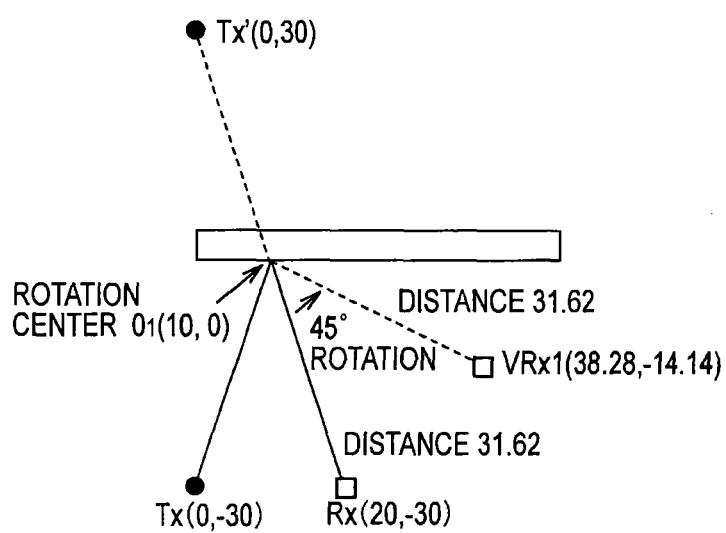
FIG. 21 is a diagram for explaining the propagation path estimation method according to the eleventh embodiment of the present invention (first 45-degree rotation).

A subsequent step is described with reference to FIG. 21. A reflection point PR1 is assumed as a first rotation center $O_1$. A virtual reception point VRx1 is calculated by rotating the reception point Rx about the rotation center $O_1$. According to the present embodiment, the rotation angle $\eta$ is assumed as 45 degree. On this basis, the coordinates of a first virtual reception point VRx1 are (32.28, −14.14). It can be confirmed that a distance from the rotation center $O_1$ to the reception point Rx and a distance from the rotation center $O_1$ to VRx1 are 31.62 respectively and equal to each other.

Figure 22:
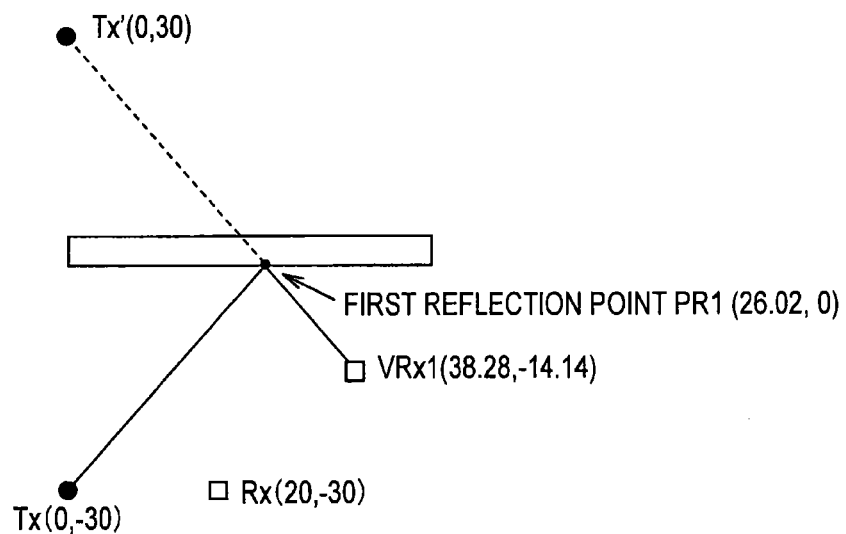
FIG. 22 is a diagram for explaining the propagation path estimation method according to the eleventh embodiment of the present invention (second 45-degree rotation).

A subsequent step is described with reference to FIG. 22. A point where a straight line connecting the first virtual reflection Vx1 and the image point Tx' of the transmission point to each other and the reflection surface 1A of the reflectarray intersect with each other is assumed as a first reflection point PR1. On this basis, the coordinates of PR1 are (26.02, 0).

Figure 23:
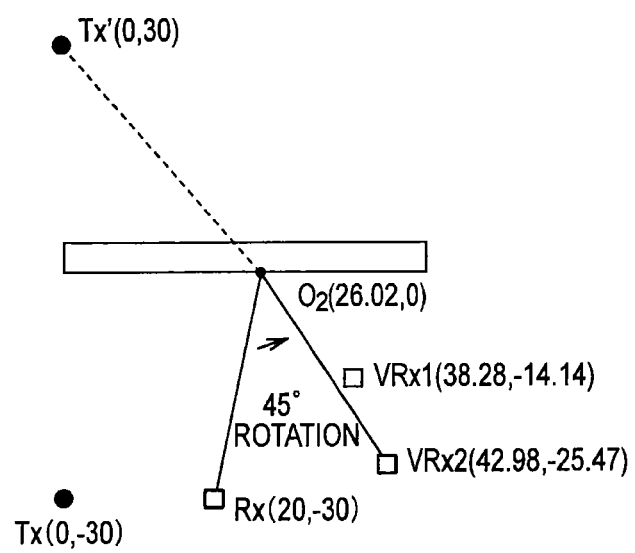
FIG. 23 is a diagram for explaining the propagation path estimation method according to the eleventh embodiment of the present invention (second 45-degree rotation).
Figure 24:
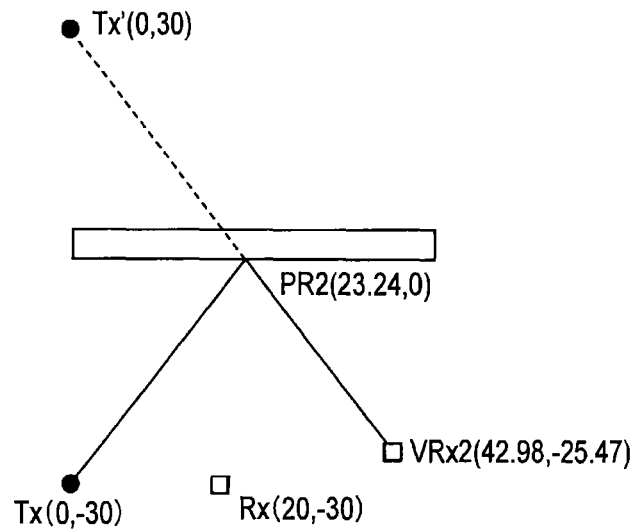
FIG. 24 is a diagram for explaining the propagation path estimation method according to the eleventh embodiment of the present invention (third 45-degree rotation).
Figure 25:
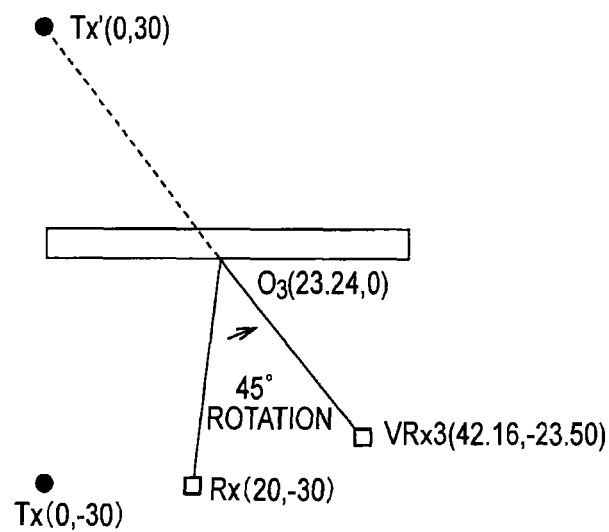
FIG. 25 is a diagram for explaining the propagation path estimation method according to the eleventh embodiment of the present invention (third 45-degree rotation).

A subsequent step is described with reference to FIG. 23. The first reflection point PR1 is assumed as a second rotation center $O_2$. VRx2 is obtained by rotating the reception point Rx by η (=45 degree) about the second rotation center $O_2$. On this basis, coordinates of VRx2 are (42.98, −25.47). By repeating the same step, a second reflection point PR2 is obtained, and the second reflection point PR2 is used as a third rotation center $O_3$. As shown in FIG. 24 and FIG. 25, the coordinates of PR and $O_3$ are (23.24, 0). VRx3 is obtained by rotating Rx by 45 degrees about the rotation center $O_3$. By repeating the same step in such a manner, the coordinates of the reflection point PR are converged. According to the present embodiment, the convergence condition of the distance is ε<0.03.

Figure 26:
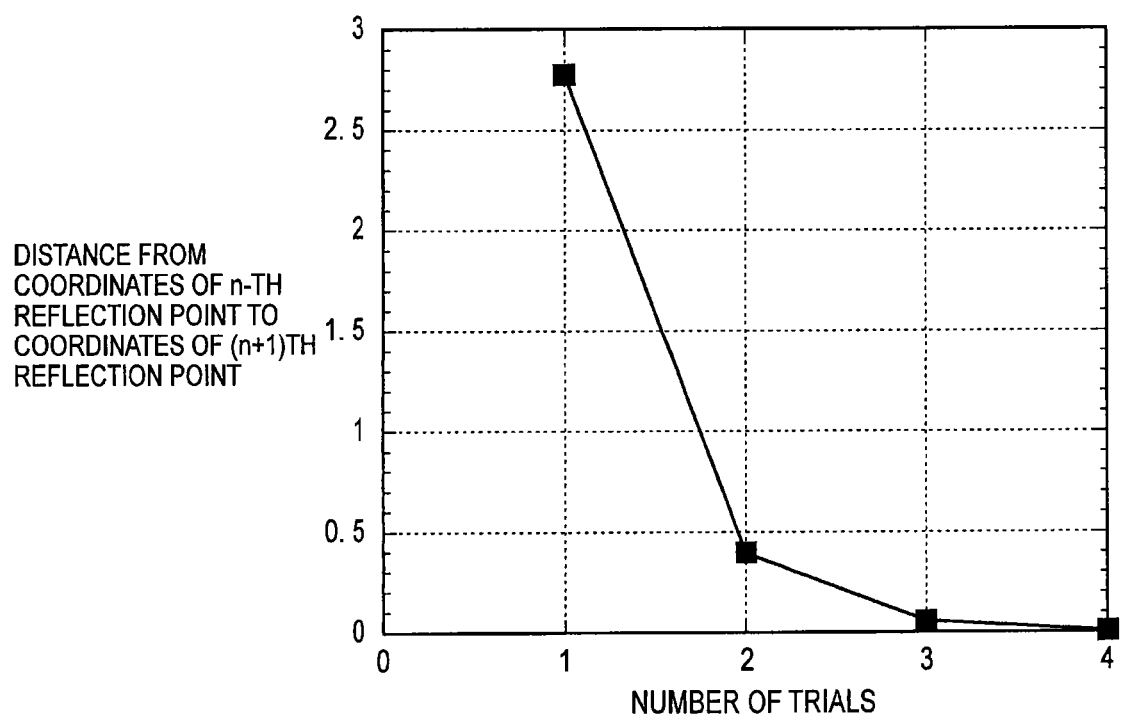
FIG. 26 is a diagram showing a convergence state of the distance up to a reflection point by the propagation path estimation method according to the eleventh embodiment of the present invention.

FIG. 26 shows a convergence state of the distance from the rotation point to the reflection point. In FIG. 26, the vertical axis represents a distance between an n-th reflection point PRn and an (n+1)th reflection point PR(n+1), and the horizontal axis represents the number of trials. It is understood that the coordinates of the reflection point are converged rapidly by increasing the number of trials.

Twelfth Embodiment of the Present Invention

A propagation path estimation method according to a twelfth embodiment of the present invention is described with reference to FIG. 27 to FIG. 32. In the present embodiment, a calculation example of the propagation path estimation method is described by using specific values.

However, it is assumed that reflection angle $θ_r$=specular reflection direction $θ_i$−η (=70°). As the convergence condition, it is assumed that convergence has been achieved when a distance between an n-th rotation point $O_n$ and the reflection point $PR_n$ becomes shorter than ε (=0.01), and then calculation completes.

Figure 27:
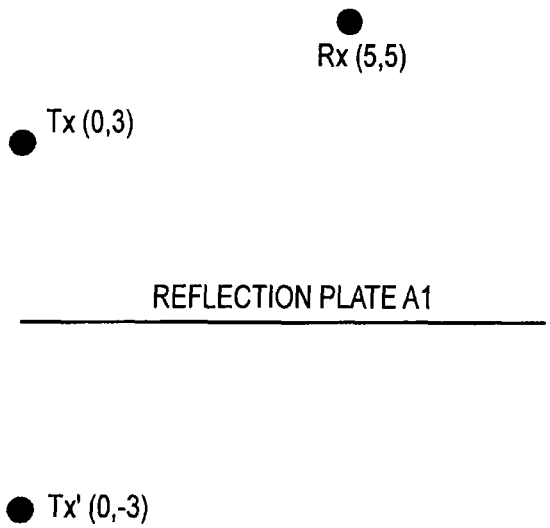
FIG. 27 is a diagram for explaining a propagation path estimation method according to a twelfth embodiment of the present invention (before rotation of reception point).

FIG. 27 is a diagram illustrating a method for obtaining a reflection point with respect to the reflection surface 1A of the reflectarray, showing two-dimensional the coordinates with the reflection surface 1A of the reflectarray provided on an xOz surface. Assuming that the coordinates of the transmission point Tx are (0, 3) and the coordinates of the reception point Rx are (5, 5), an image point Tx' of the transmission point Tx with respect to the reflection surface 1A of the reflectarray is created. At that time, the coordinates of Tx' are (0, −3).

Figure 28:
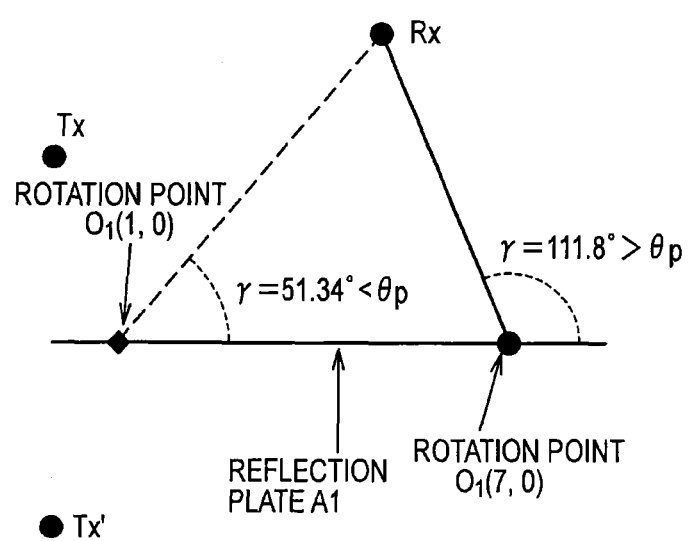
FIG. 28 is a diagram for explaining the propagation path estimation method according to the twelfth embodiment of the present invention (first 70-degree rotation).

FIG. 28 is a diagram for explaining a method for obtaining a first rotation point $O_1$. The first rotation point $O_1$ may be any point on the x axis. However, the rotation point will be selected in such a manner that a rotated virtual reflection point is not at a position lower than the reflection plate or angle condition of the rotation point bringing a negative y coordinate ∠RxO1x (=γ)≥η is satisfied.

When the rotation point $O_1$ is (1,0), the angle γ (=51.34°) is smaller than the rotation angle η (=70°). In this case, since the angle does not satisfy the angle condition of the rotation point, the rotation point $O_1$ must be obtained again. When the rotation point $O_1$ is (7, 0), the angle γ (=111.8°) is larger than the rotation angle) η (=70°). In this case, since the angle satisfies the angle condition of the rotation point, a first rotation point is assumed as (7, 0).

Figure 29:
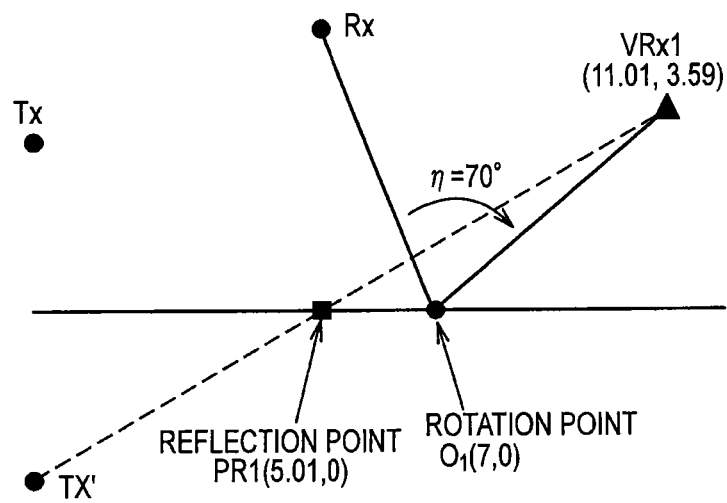
FIG. 29 is a diagram for explaining the propagation path estimation method according to the twelfth embodiment of the present invention (first 70-degree rotation).

FIG. 29 is a diagram for explaining a step of calculating a first virtual reception point VRx1 and a first reflection point PR1. VRx1 is a value obtained by rotating Rx clockwise by an angle η(=70°) about $O_1$. At that time, the coordinates of VRx1 are (11.01, 3.59). Further, the first reflection point PR1 is calculated by connecting VRx and Tx' to each other. At that time, the coordinates of PR1 are (5.01, 0). Since a distance between PR1 and $O_1$ is 1.99 and larger than ε (=0.01), a second rotation point $O_2$ is calculated.

Figure 30:
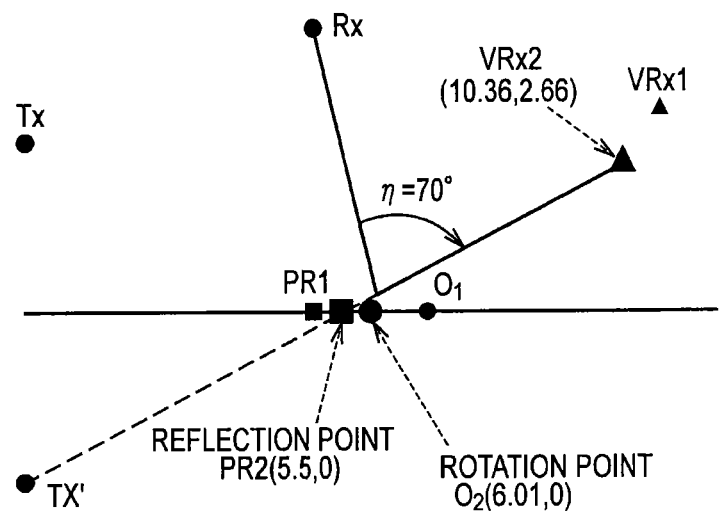
FIG. 30 is a diagram for explaining the propagation path estimation method according to the twelfth embodiment of the present invention (second 70-degree rotation).

FIG. 30 is a diagram for explaining a step of calculating the second rotation point $O_2$, a virtual reception point VRx2, and a reflection point PR2. Assuming that a midpoint between $O_1$ and PR1 is the rotation point $O_2$, the coordinates of $O_2$ are (6.01, 0).

Further, since the angle γ (=101.39°) is larger than the rotation angle η, the angle condition of the rotation point is satisfied. VRx2 is a point obtained by rotating Rx clockwise by η°, about the rotation point O. At that time, the coordinates of VRx2 are (10.36, 2.66). Further, a reflection point PR2 is calculated by connecting VRx2 and Tx' to each other, and (5.5, 0) is obtained as the coordinates of PR2.

Since the distance between PR2 and $O_2$ is 0.51 and longer than ε, the convergence condition is not satisfied. Therefore, a third rotation point $O_3$, a virtual reception point VRx3, and a reflection point PR3 are calculated consecutively. Calculation is made consecutively by repeating these steps until the convergence condition is satisfied. In a same manner, steps of calculating third and fourth rotation points, virtual reception points and reflection points are repeated. At that time, respective the coordinates are $O_3$ (5.75, 0), VRx3 (10.19, 2.42), PR3 (5.65, 0), $O_4$ (5.7, 0), VRx4 (10.16, 2.37), and PR4 (5.68, 0). Distance from $O_3$ to PR3 and distance from $O_4$ to PR4 are 0.11 and 0.02 respectively (relevant diagram is omitted).

Figure 31:
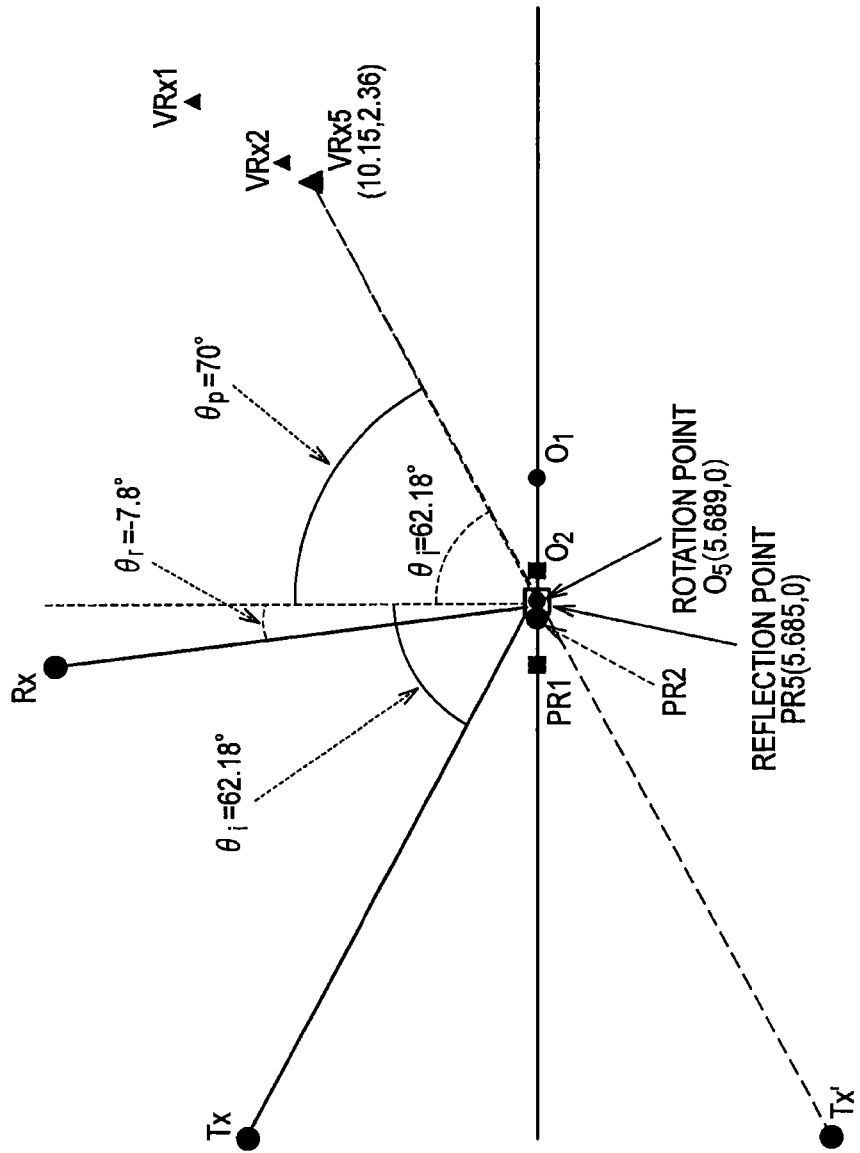
FIG. 31 is a diagram for explaining the propagation path estimation method according to the twelfth embodiment of the present invention (fifth 70-degree rotation).

FIG. 31 is a diagram showing the coordinates of a converged rotation point, a virtual reception point, and a reflection point. The convergence state corresponds to completion of calculation of a fifth reflection point, with $O_5$ (5.69, 0), VRx5 (10.15, 2.36), and PR5 (5.68, 0). At that time, a distance between PR5 and $O_5$ is 0.004 and not longer than ε. Further, an incident angle $θ_i$ and a reflection angle $θ_r$ are 62.18° and −7.8° respectively.

Figure 32:
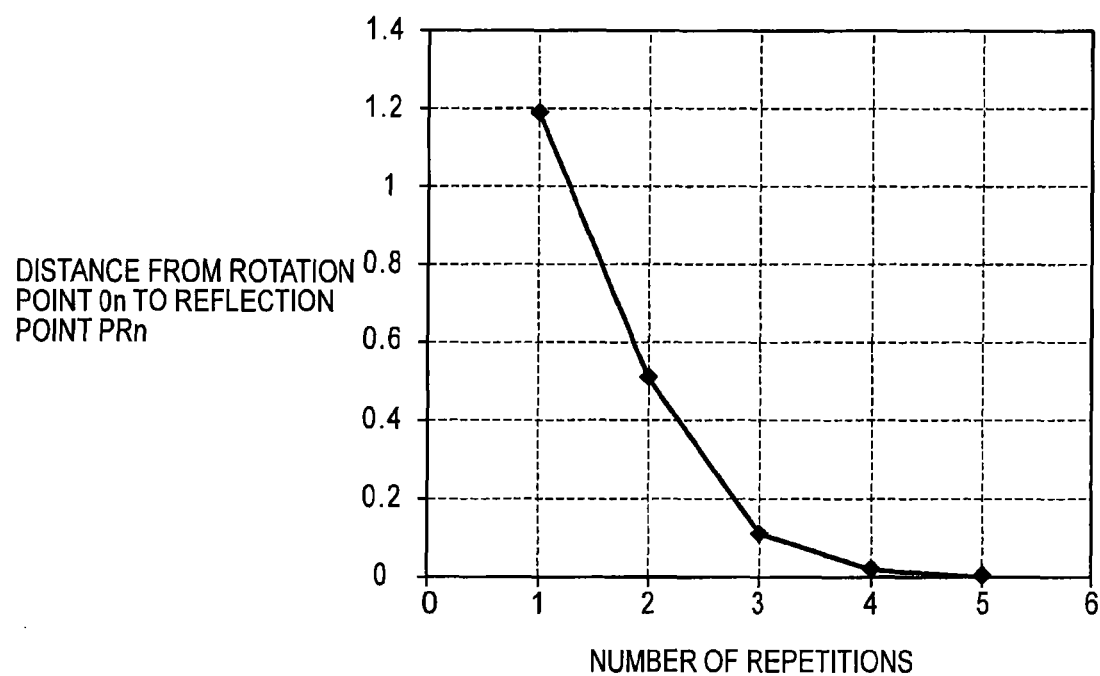
FIG. 32 is a diagram showing a convergence state of the distance up to a reflection point by the propagation path estimation method according to the twelfth embodiment of the present invention.

FIG. 32 shows a convergence state of the distance from the rotation point to the reflection point. The vertical axis represents the distance from an n-th rotation point $O_n$ to an n-th reflection PRn, and the horizontal axis represents the number of trials. It is understood that the distance is converged rapidly as the distance between the rotation point $O_n$ and the reflection point PRn becomes shorter by increasing the number of trials.

Thirteenth Embodiment of the Present Invention

A propagation path estimation method according to a thirteenth embodiment of the present invention is described with reference to FIG. 33 to FIG. 38. In the present embodiment, a calculation example of the propagation path estimation method is described by using specific values.

In the present embodiment, it is assumed that an incident angle $θ_i$, a reflection angle $θ_r$, and a rotation angle η satisfy the following conditions:

$$\sin(θ_r) = \sin(θ_i) - \sin(θ_p) \tag{1}$$

$$θ_r = θ_i - η_n \tag{2}$$

Here, when $θ_p$ is a fixed angle of 70°, the rotation angle η is a function of the incident angle $θ_i$. As the convergence condition, it is assumed that convergence is achieved when a distance between an n-th rotation point $O_n$ and an n-th reflection point PRn becomes shorter than ε (=0.01), and then calculation completes.

Figure 33:
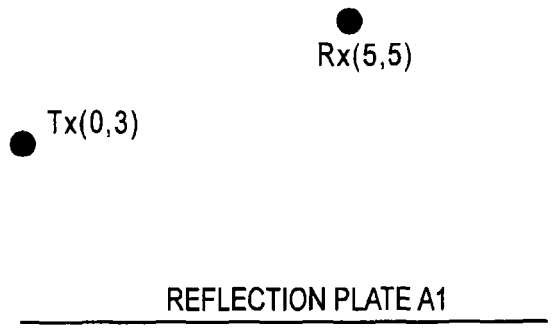
FIG. 33 is a diagram for explaining a propagation path estimation method according to a thirteenth embodiment of the present invention (before rotation of reception point).

FIG. 33 is a diagram illustrating a method for obtaining a reflection point with respect to the reflection surface 1A of the reflectarray, showing two-dimensional coordinates with the reflection surface 1A of the reflectarray provided on an xOz surface. Assuming that the coordinates of the transmission point Tx are (0, 3) and the coordinates of the reception point Rx are (5, 5), an image point Tx' of the transmission point Tx with respect to the reflection surface 1A of the reflectarray is created. Coordinates of Tx' thus obtained are (0, −3).

Figure 34:
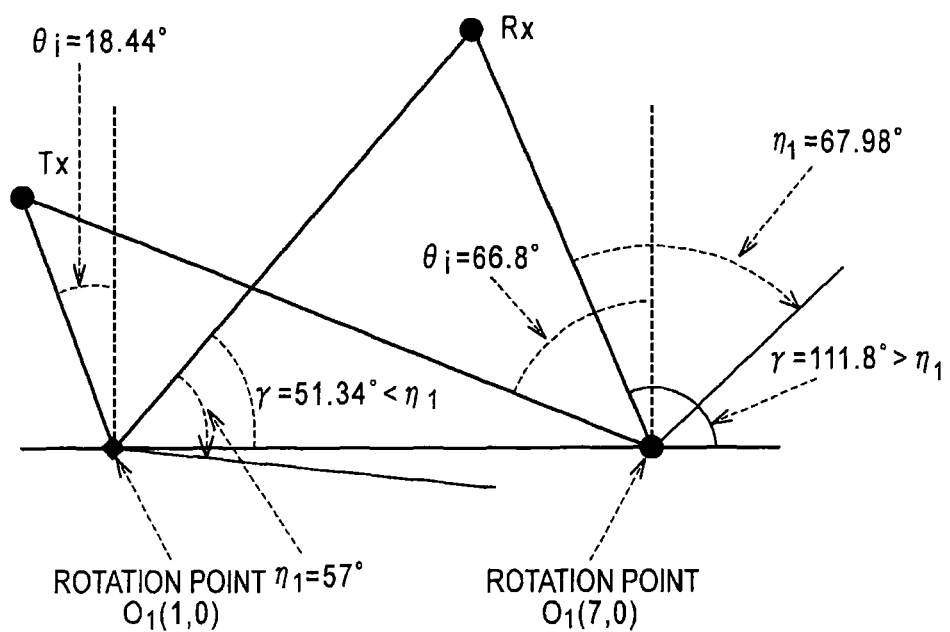
FIG. 34 is a diagram for explaining the propagation path estimation method according to the thirteenth embodiment of the present invention (first).

FIG. 34 is a diagram for explaining a method for obtaining a first rotation point $O_1$. The first rotation point $O_1$ may be any point on the x axis. However, the rotation point will be selected in such a manner that a rotated virtual reflection point is not at a position lower than the reflection plate or an angle condition of the rotation point bringing to a negative y coordinate $\angle RxO1x \ (=\gamma) \geq \eta_n$, is satisfied.

When the rotation point $O_1$ is (1, 0), the incident angle $\theta_i$ is 18.44°. By substituting in the conditions (1) and (2), the reflection angle $\theta r$ of −33.57° and the rotation angle $\eta_1$ of 57.00° can be obtained. At that time the angle $\gamma$ is 51.34°. Since the angle does not satisfy the angle condition of the rotation point ($\gamma \geq \eta_n$), it is necessary to obtain the rotation angle $O_1$ again. When the rotation point $O_1$ is (7, 0), the incident angle $\theta_i$, the reflection angle $\theta r$, and the rotation angle $\eta_1$ are 66.8°, −111.8°, and 67.98° respectively. Since the angle $\gamma$ (=1.8° is larger than the rotation angle $\eta_1$ (=67.98°), the condition of the rotation point is satisfied. Therefore, a first rotation point is assumed as $O_1$ (7, 0).

Figure 35:
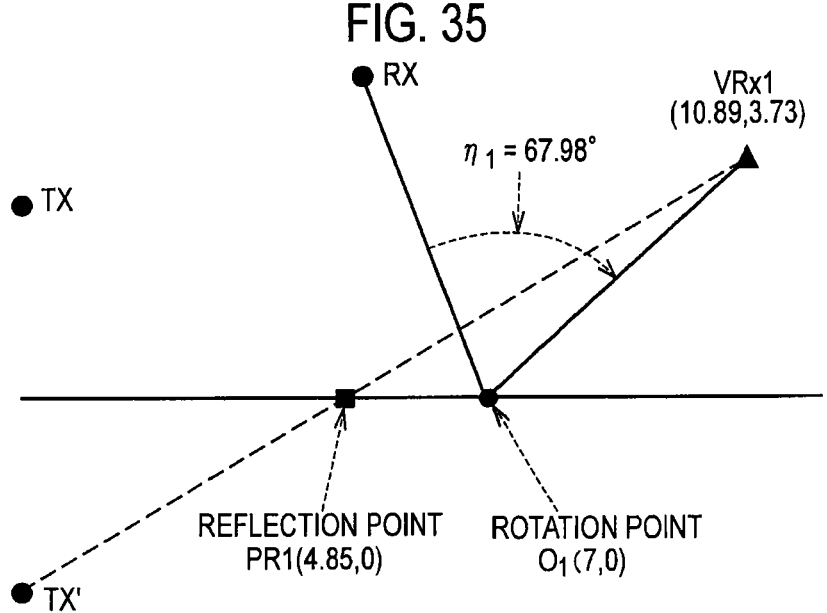
FIG. 35 is a diagram for explaining the propagation path estimation method according to the thirteenth embodiment of the present invention (first).

FIG. 35 is a diagram for explaining steps of calculating a first virtual reception point VRx1 and a first reflection point PR1. VRx1 is a point obtained by rotating Rx clockwise by the rotation angle $\eta_1$ (=67.98) about $O_1$. At that time, the coordinates of VRx1 are (10.89, 3.73). Further, the first reflection point PR1 is calculated by connecting VRx and Tx' to each other. Coordinates of PR1 thus obtained are (4.85, 0). Since distance between PR1 and $O_1$ is 2.147 and larger than $\epsilon$ (=0.01), a second rotation point $O_2$ is calculated.

Figure 36:
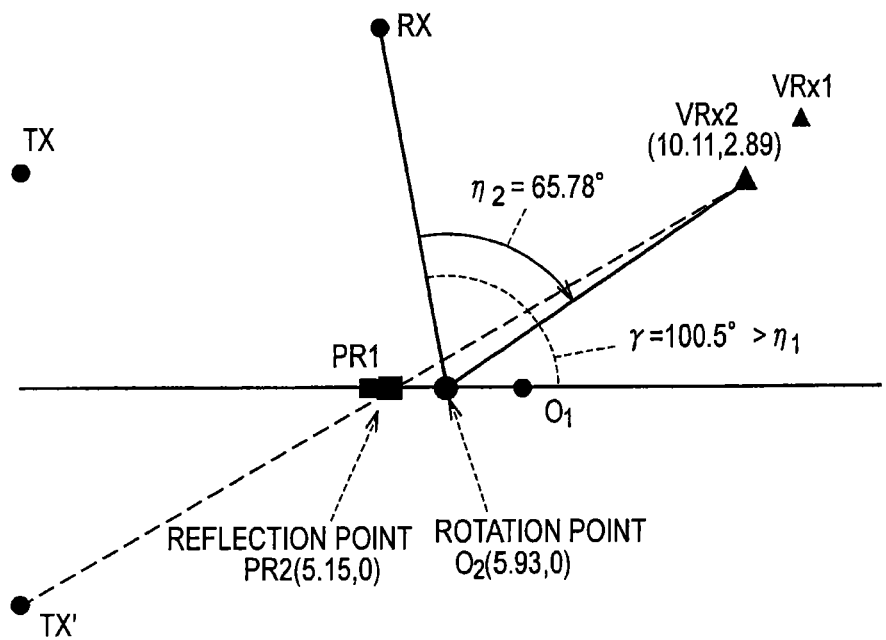
FIG. 36 is a diagram for explaining the propagation path estimation method according to the thirteenth embodiment of the present invention (second).

FIG. 36 is a diagram for explaining steps of calculating the second rotation point $O_2$, a virtual reception point VRx2, and a reflection point PR2. Assuming that a midpoint between the rotation point $O_1$ and the reflection point PR1 is the rotation point $O_2$, the coordinates of $O_2$ are (5.93, 0).

Further, since the angle $\gamma$ (=100.5°) is larger than the rotation angle $\eta_2$ (65.78, 0), the angle condition of the rotation point is satisfied. VRx2 is a point obtained by rotating Rx clockwise by $\eta_2$, about the rotation point $O_2$. At that time, the coordinates of VRx2 are (10.11, 2.39). Further, a reflection point PR2 is calculated by connecting VRx2 and Tx' to each other, and (5.15, 0) is obtained as the coordinates of PR2.

Since distance between PR2 and $O_2$ is 0.78 and longer than $\epsilon$, a third rotation point $O_3$, a third virtual reception point VRx3, and a third reflection point PR3 are calculated consecutively. Calculation is made consecutively by repeating these steps until the convergence condition is satisfied. As a result, the coordinates of third, fourth and fifth rotation points, virtual reception points and reflection points are as follows:

$O_3$ (5.54, 0), VRx3 (9.84, 2.6), PR3 (5.27, 0)
$O_4$ (5.41, 0), VRx4 (9.75, 2.5), PR4 (5.32, 0)
$O_5$ (5.36, 0), VRx5 (9.72, 2.47), PR5 (5.33, 0)

Distances $O_3PR3$, $O_4PR4$, and $O_5PT5$ are 0.265, 0.088, and 0.029, respectively (diagrams for the third to fifth calculations are omitted).

Figure 37:
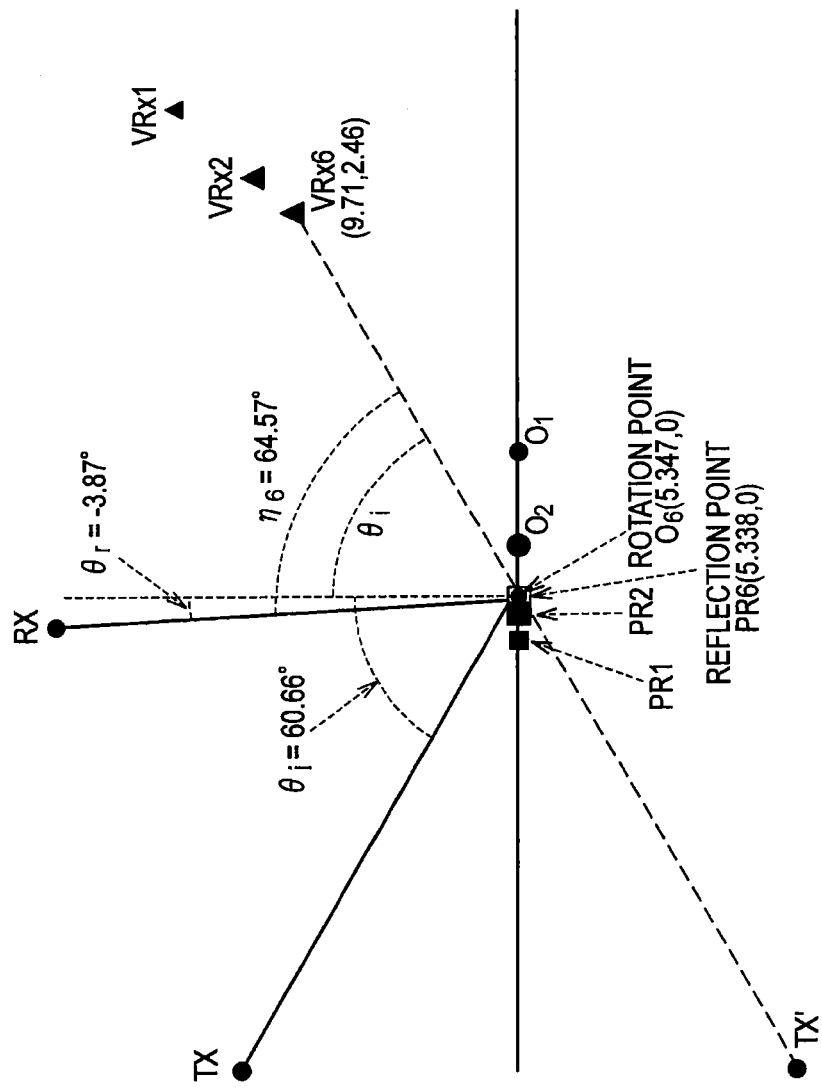
FIG. 37 is a diagram for explaining the propagation path estimation method according to the thirteenth embodiment of the present invention (sixth, after convergence).

FIG. 37 is a diagram showing the coordinates of the converged rotation point, the virtual reception point, and the reflection point. The convergence state corresponds to calculation completion of a sixth reflection, with $O_6$ (5.35, 0), VRx6 (9.71, 2.46), PR6 (5.33, 0). At that time distance between PR6 and $O_6$ is 0.01 and not longer than $\epsilon$. Further, an incident angle $\theta_i$ and a reflection angle $\theta_r$ are 60.66° and −3.86° respectively.

Figure 38:
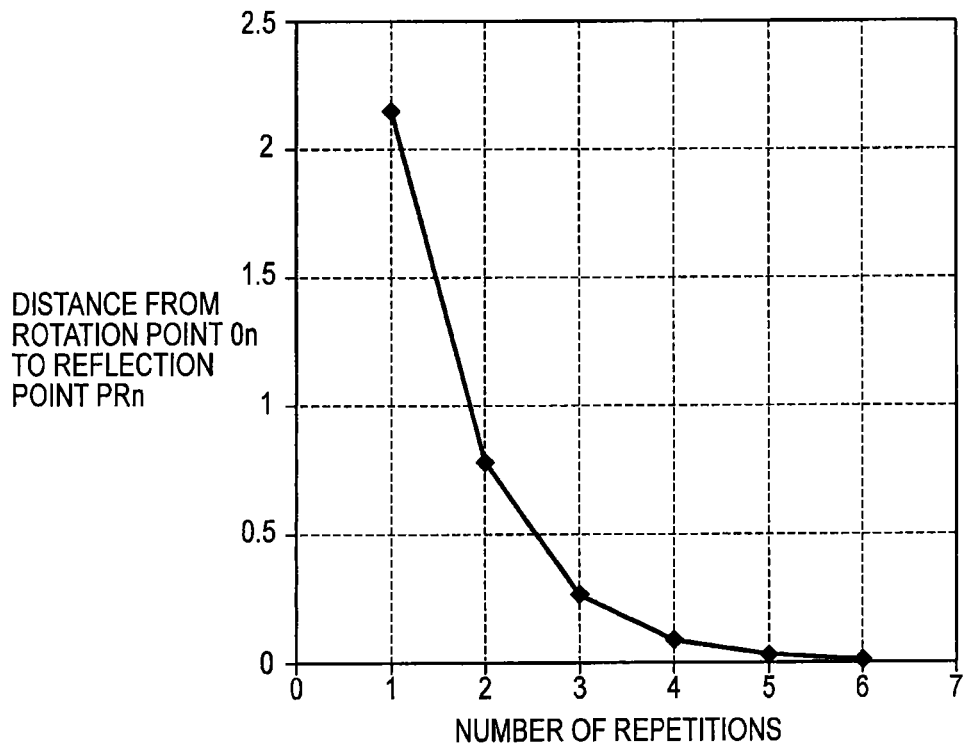
FIG. 38 is a diagram showing a convergence state of the distance up to a reflection point by the propagation path estimation method according to the thirteenth embodiment of the present invention.

FIG. 38 is a diagram showing a convergence state of a distance from the rotation point to the reflection point. The vertical axis represents an n-th rotation point $O_n$ and an n-th reflection point PRn, and the horizontal axis represents the number of trials. It is understood that convergence is achieved rapidly as the distance between the rotation point $O_n$ and the reflection point PRn becomes shorter by increasing the number of trials.

Fourteenth Embodiment of Present Invention

A propagation path estimation method according to a fourteenth embodiment of the present invention is described with reference to FIG. 39 to FIG. 46. In the present embodiment, a calculation example of the propagation path estimation method is described by using specific values.

Figure 39:
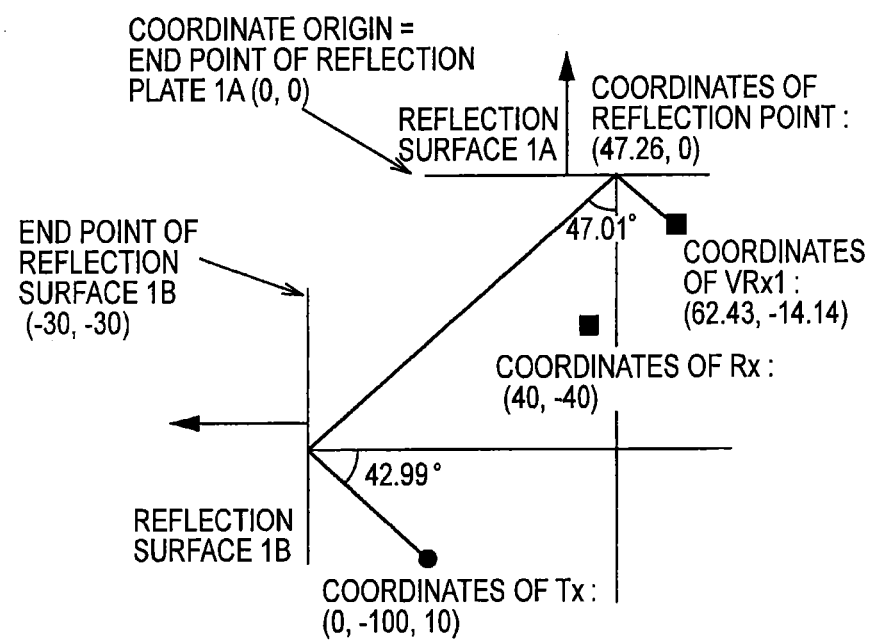
FIG. 39 is a diagram for explaining a propagation path estimation method according to a fourteenth embodiment of the present invention (first, 45-degree rotation).

FIG. 39 is a diagram for explaining a method for obtaining a propagation path when reflection occurs two times on two reflection surfaces including a reflection surface of the reflectarray, showing two-dimensional coordinates with one end of the reflection surface 1A of the reflectarray as an origin (0, 0). Specifically, FIG. 39 shows calculation results of one reflection each on two reflection surfaces or two reflections in total from the transmission point Tx by assuming the coordinates of the transmission point Tx as (0, −100), and the coordinates of the reception point Rx as (40, −40).

Here, a first reflection surface is assumed to be the reflection surface 1A of the reflectarray, and a second reflection surface is assumed to be a wall surface of normal reflection. An image point Tx' of the transmission point Tx with respect to a reflection surface 1B and an image point Tx" of Tx' with respect to a reflection surface 1A are created. At that time, the coordinates of Tx" are (−60, −100). A first rotation center $O_1$ is selected at any point on the reflection surface 1A.

According to the present embodiment, the first rotation center $O_1$ is assumed as (20,0). A virtual reception point VRx1 is calculated by rotating the reception point Rx about the first rotation center $O_1$. According to the present embodiment, the rotation angle $\eta$ is assumed as 45 degree. On this basis, the coordinates of the first virtual reception point VRx1 are (62.43, −14.14). It can be confirmed that a distance from the rotation center $O_1$ to the reception point Rx and a distance from the rotation center $O_1$ to VRx1 are 44.72 respectively and are equal to each other.

Figure 40:
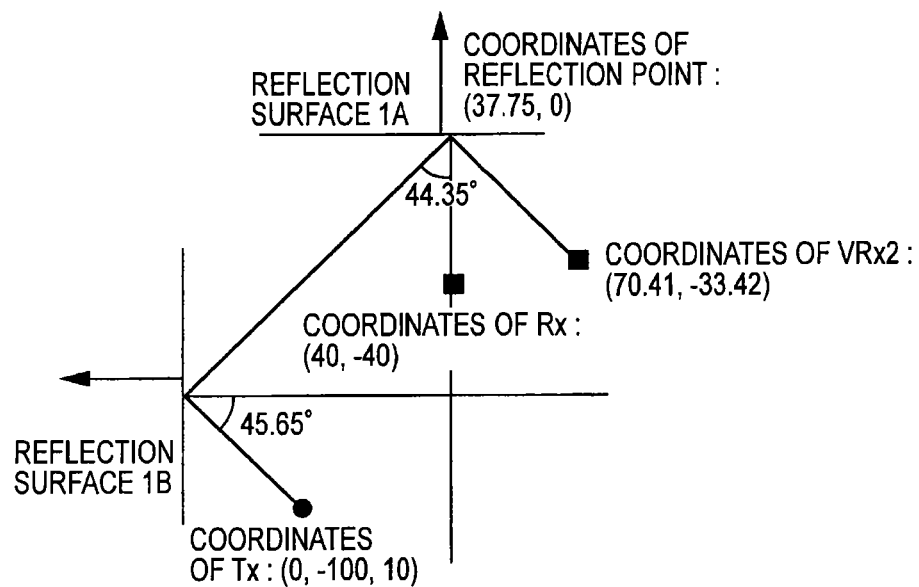
FIG. 40 is a diagram for explaining the propagation path estimation method according to the fourteenth embodiment of the present invention (second, 45-degree rotation).

A subsequent step is described with reference to FIG. 40. An intersection point between a straight line connecting the first virtual reflection point Vx1 and a second reflection image point Tx" of the transmission point to each other and the reflection surface 1A of the reflectarray is assumed as a first reflection point PR1. On this basis, the coordinates of PR1 are (47.26, 0).

Figure 41:
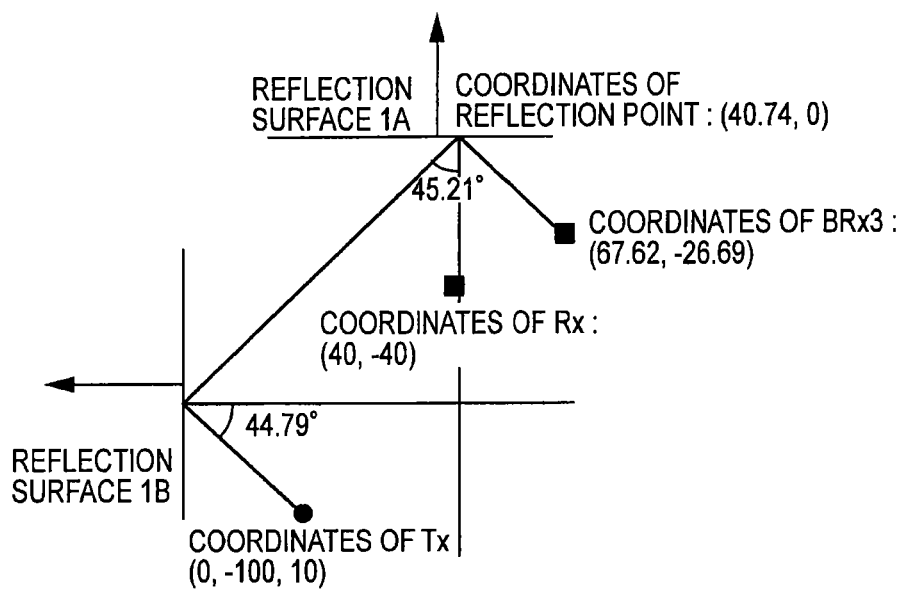
FIG. 41 is a diagram for explaining the propagation path estimation method according to the fourteenth embodiment of the present invention (third, 45-degree rotation).
Figure 42:
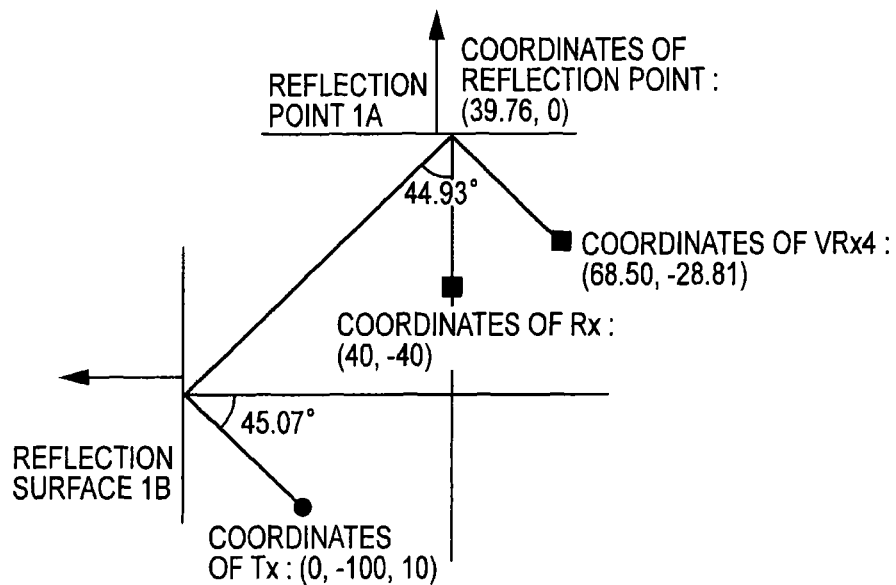
FIG. 42 is a diagram for explaining the propagation path estimation method according to the fourteenth embodiment of the present invention (fourth, 45-degree rotation).
Figure 43:
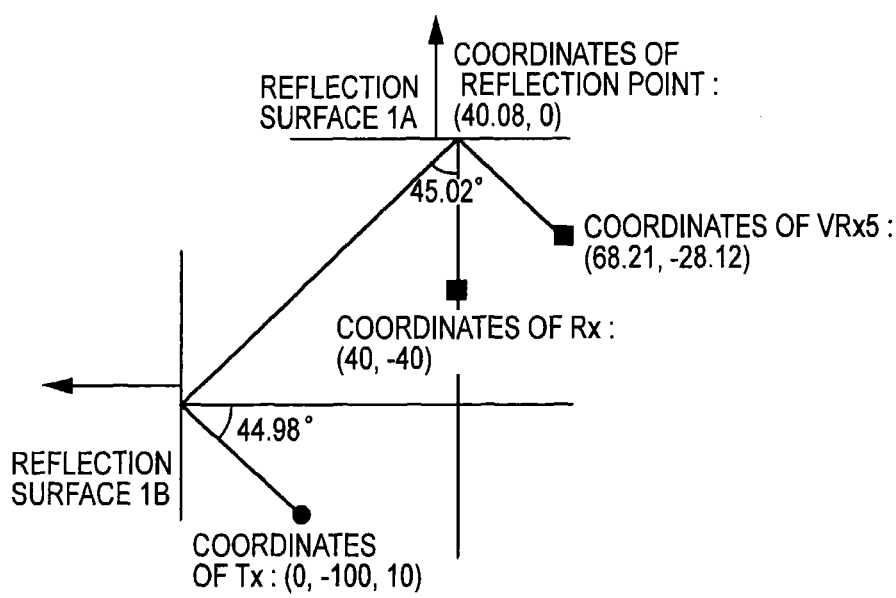
FIG. 43 is a diagram for explaining the propagation path estimation method according to the fourteenth embodiment of the present invention (fifth, 45-degree rotation).

An intersection point with a second reflection surface 1B is obtained as an intersection point between a straight line connecting the first reflection point PR1 and an image point Tx' of the transmission point Tx with respect to a reflection surface 1B to each other and a reflection surface 1B. On this basis, the coordinates of the reflection point are (−30, −72.03). VRx2 is obtained by rotating the reception point Rx by $\eta$ (=45 degrees), about the second rotation point $O_2$. Coordinates of VRx2 thus obtained are (70.41, −33.42). In a same manner, a second reflection point PR2 is obtained. The second reflection point PR2 thus obtained is used as a third rotation center $O_3$. Coordinates of PR2 and $O_3$ are (37.75, 0). In a same manner, a virtual reception point VRx3 is obtained by rotating Rx by 45 degrees about the rotation center $O_3$, as shown in FIG. 41. Coordinates of a reflection point PRn are converged by repeating same steps as shown in FIG. 42 and FIG. 43.

Figure 44:
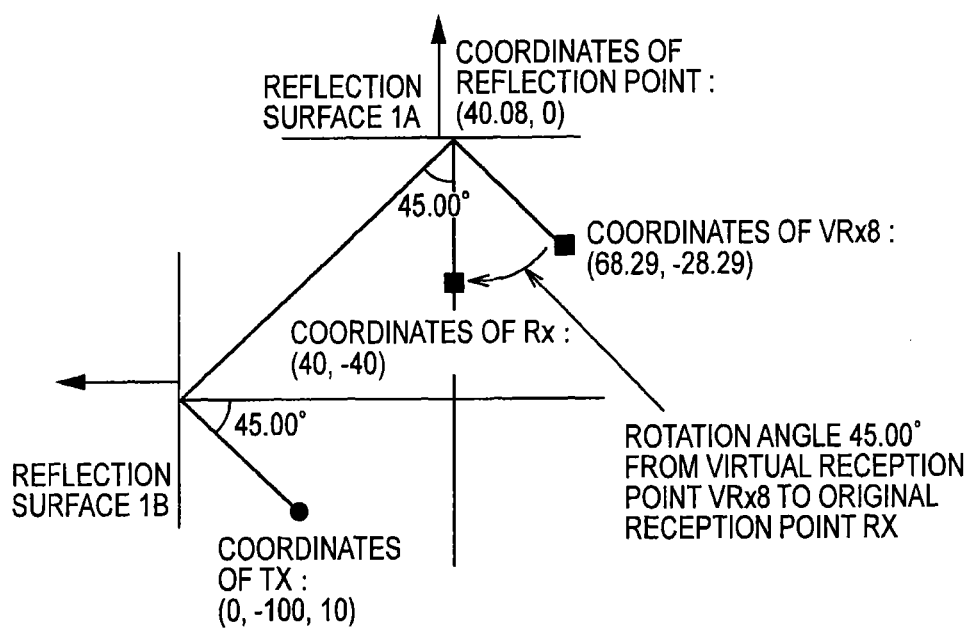
FIG. 44 is a diagram for explaining the propagation path estimation method according to the fourteenth embodiment of the present invention (eighth, 45-degree rotation).

FIG. 44 is a convergence state after an 8th rotation. An incident angle to the reflection surface 1A of the reflectarray is 45.00 degrees, and a reflection angle from a reflection point PR8 to a reflection point RX is 0 degrees with respect to the normal direction to the reflection surface. This angle is the same as an angle when direction control is made to 45 degrees counterclockwise with respect to a normal reflection direction of 45 degrees, showing that convergence is achieved to the calculation result of a propagation path desired to be obtained finally.

Figure 45:
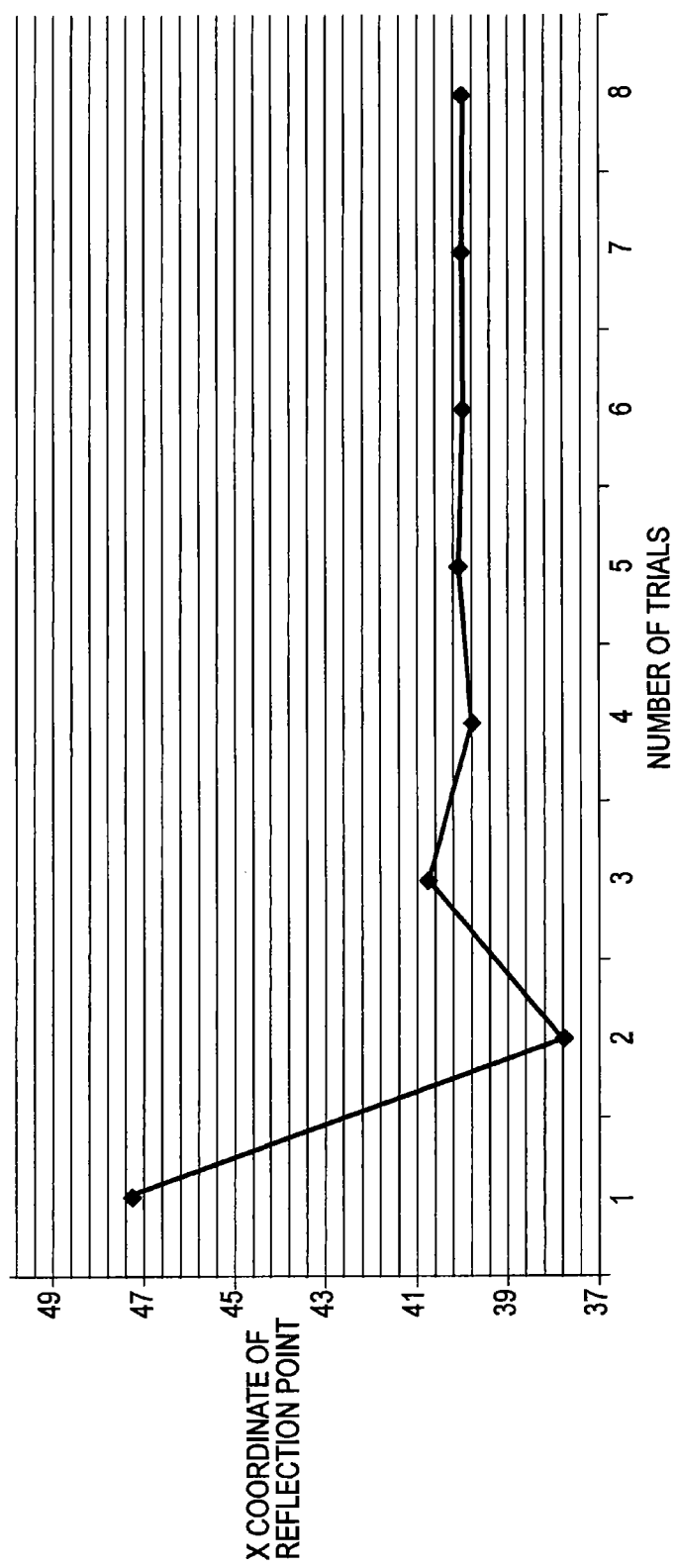
FIG. 45 is a diagram showing a convergence state of the reflection point by the propagation path estimation method according to the fourteenth embodiment of the present invention.
Figure 46:
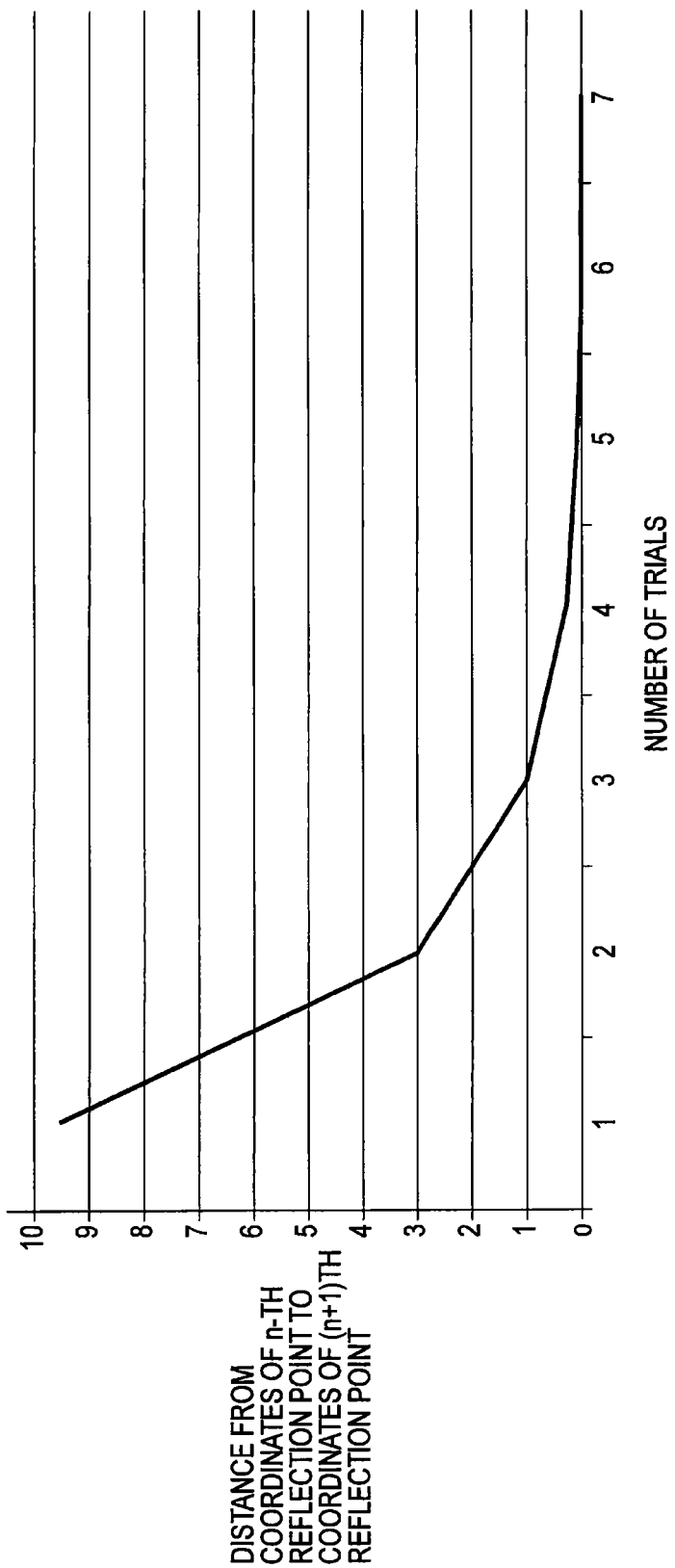
FIG. 46 is a diagram showing a convergence state of the reflection point difference by the propagation path estimation method according to the fourteenth embodiment of the present invention.

FIG. 45 and FIG. 46 show a convergence state of the reflection points and a convergence state of a difference between the reflection points. The vertical axis of FIG. 45 represents the x coordinate of a reflection surface on the reflection surface 1A of the reflectarray, and the vertical axis of FIG. 46 is the distance from an n-th reflection point PRn to an (n+1)th reflection point PR(n+1). The horizontal axis represents the number of trials. It is understood that the coordinates of reflection points are converged rapidly by increasing the number of trials.

Fifteenth Embodiment of Present Invention

A propagation path estimation method according to a fifteenth embodiment of the present embodiment is described with reference to FIG. 47 to FIG. 56. In the present embodiment, a calculation example of the propagation path estimation method is described by using specific values.

Figure 47:
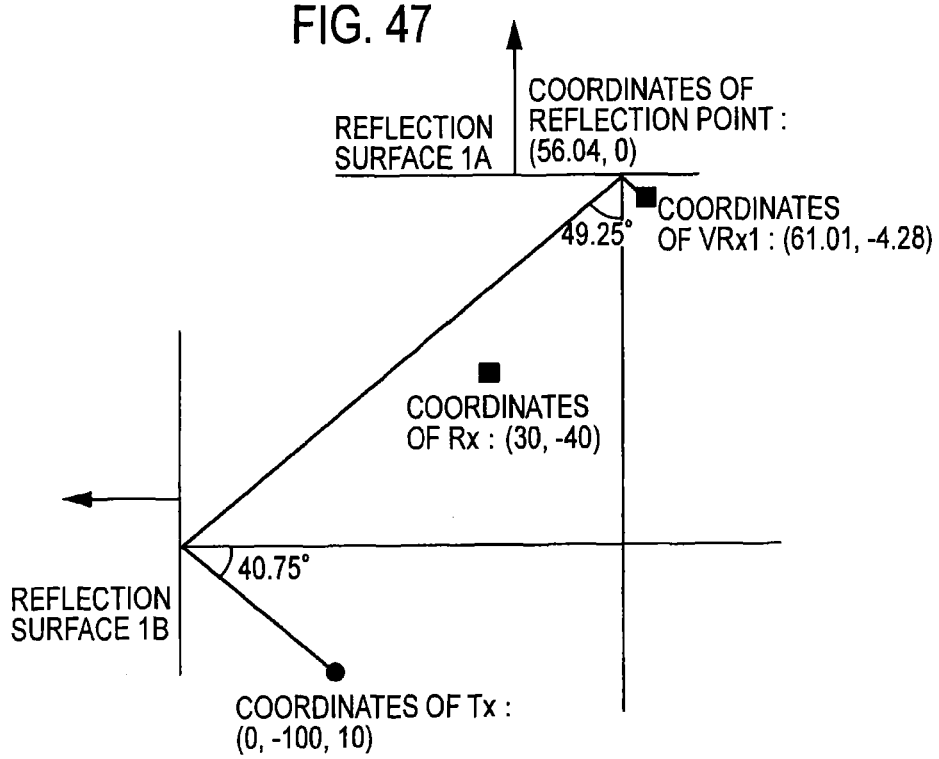
FIG. 47 is a diagram for explaining a propagation path estimation method according to a fifteenth embodiment of the present invention (first, 70-degree rotation).

FIG. 47 is a diagram for explaining a method for obtaining a propagation path when reflection occurs two times on two reflection surfaces including a reflection surface of the reflectarray, showing two-dimensional the coordinates with one end of the reflection surface 1A of the reflectarray as an origin (0, 0). This is a calculation result of one reflection each on two reflection surfaces or two reflections in total from the transmission point Tx, with the coordinates of the transmission point Tx at (0, −100), and the coordinates of the reception point Rx at (30, −40). According to the present embodiment, the rotation angle η of reflection is assumed to be 70 degree.

A first reflection surface is assumed as the reflection surface 1A of the reflectarray, and a second reflection surface is assumed as a wall surface of normal reflection. An image point Tx' of the transmission point Tx with respect to a reflection surface 1B and an image point Tx" of Tx' with respect to the reflection surface 1A are created. Coordinates of Tx" thus obtained are (−60, −100). A first rotation center $O_1$ is selected at any point on the reflection surface 1A.

According to the present embodiment, the coordinates of a first rotation center $O_1$ are assumed to be (20, 0). A virtual reception point VRx1 is calculated by rotating the reception point Rx about the first rotation center $O_1$. Coordinates of the first virtual reception point VRx1 thus obtained are (61.01, −4.28). It can be confirmed that a distance from the rotation center $O_1$ to the reception point Rx and a distance from the rotation center $O_1$ to VRx1 are 41.23 respectively and are equal to each other.

An intersection point between a straight line connecting the first virtual reflection point Vx1 and a second reflection image point Tx" of the transmission point to each other and the reflection surface 1A of the reflectarray is assumed as a first reflection point PR1. On this basis, the coordinates of PR1 are (44.76,0). An intersection point with a second reflection point 1B is obtained as an intersection point between the reflection surface 1B and a straight line connecting the first reflection point PR1 and the image point Tx' of the transmission point Tx with respect to the reflection surface 1B to each other.

Figure 48:
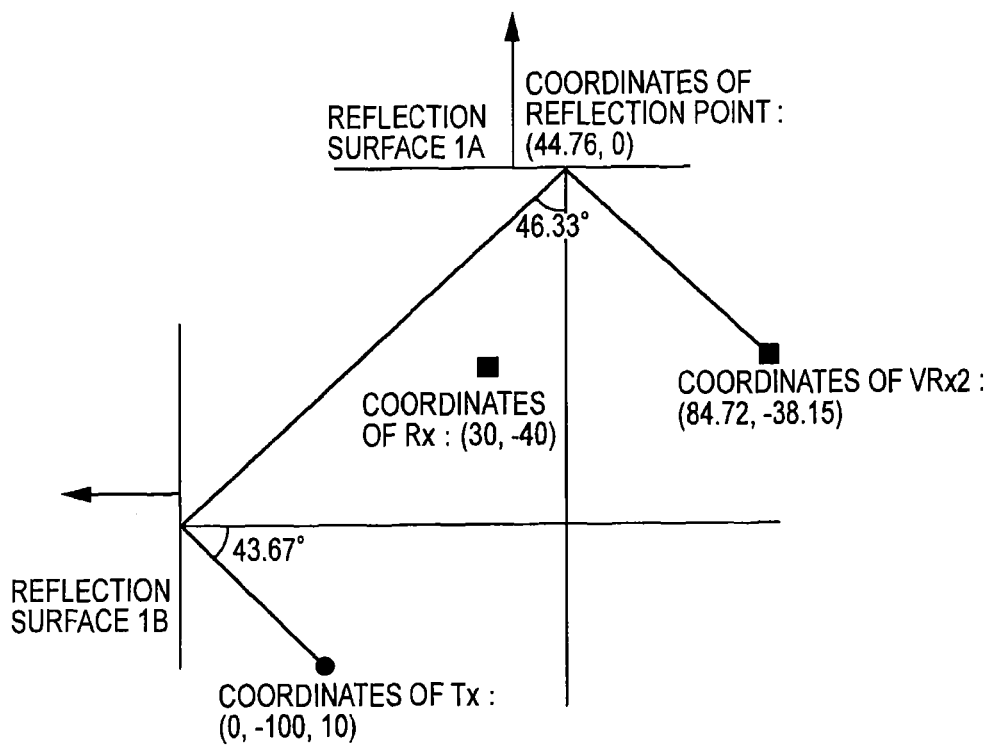
FIG. 48 is a diagram for explaining the propagation path estimation method according to the fifteenth embodiment of the present invention (second, 70-degree rotation).

A subsequent step is described with reference to FIG. 48. The first reflection point PR1 is used as a second rotation center $O_2$. Vrx2 is obtained by rotating the reception point Rx by η (=70 degree) about the second rotation center $O_2$. The coordinates of VRx2 thus obtained are (84.72, −38.15). By performing same steps, a second reflection point PR2 is obtained. The second reflection point PR2 is used as a third rotation center $O_3$. The coordinates of PR2 and $O_3$ thus obtained are (44.76, 0).

Figure 49:
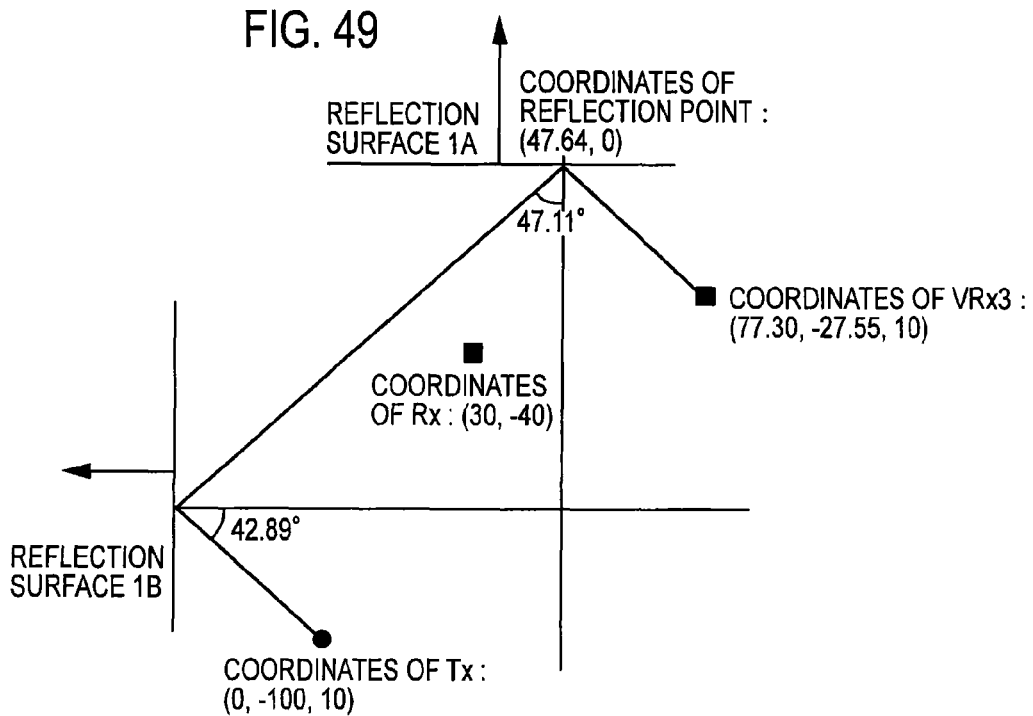
FIG. 49 is a diagram for explaining the propagation path estimation method according to the fifteenth embodiment of the present invention (third, 70-degree rotation).
Figure 50:
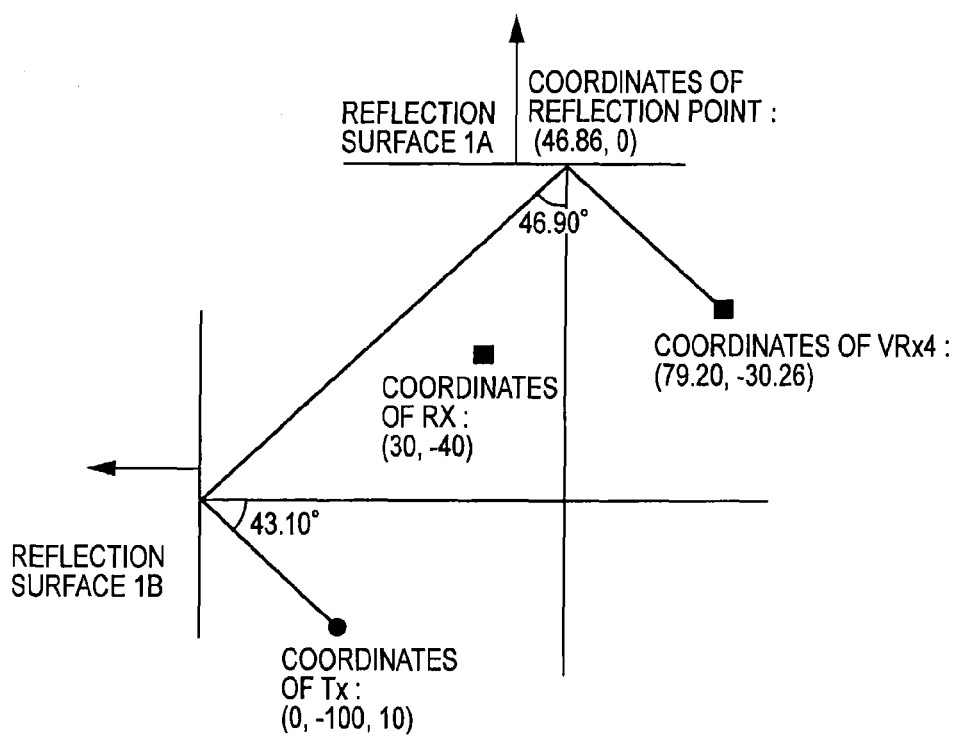
FIG. 50 is a diagram for explaining the propagation path estimation method according to the fifteenth embodiment of the present invention (fourth, 70-degree rotation).
Figure 51:
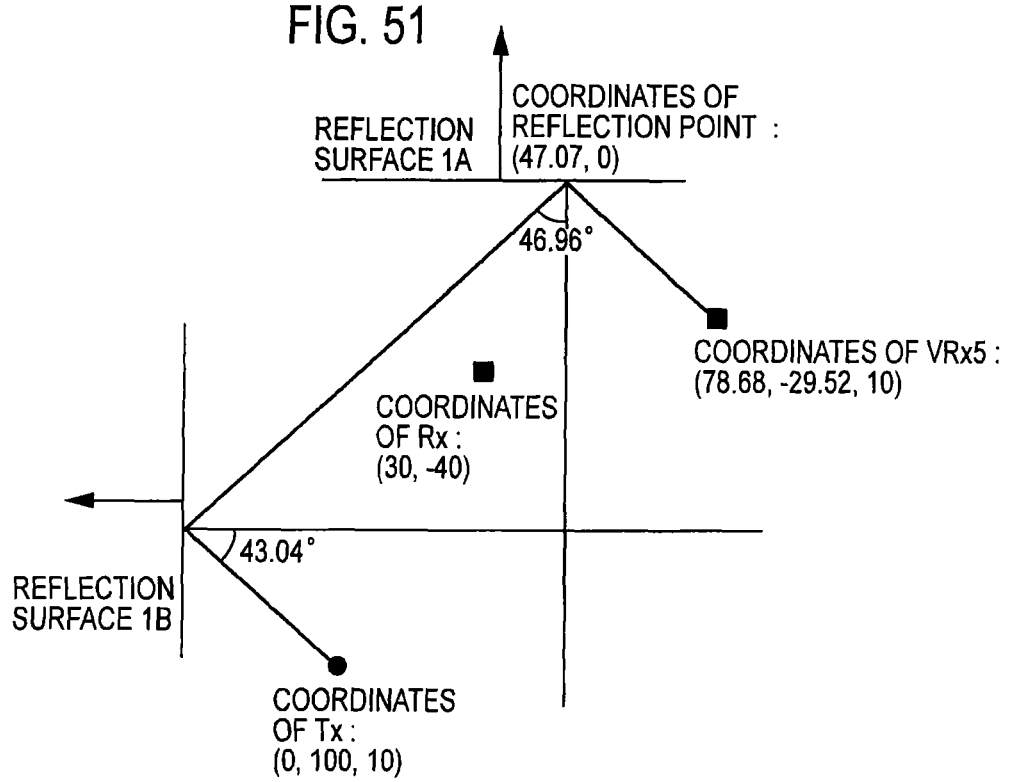
FIG. 51 is a diagram for explaining the propagation path estimation method according to the fifteenth embodiment of the present invention (fifth, 70-degree rotation).
Figure 52:
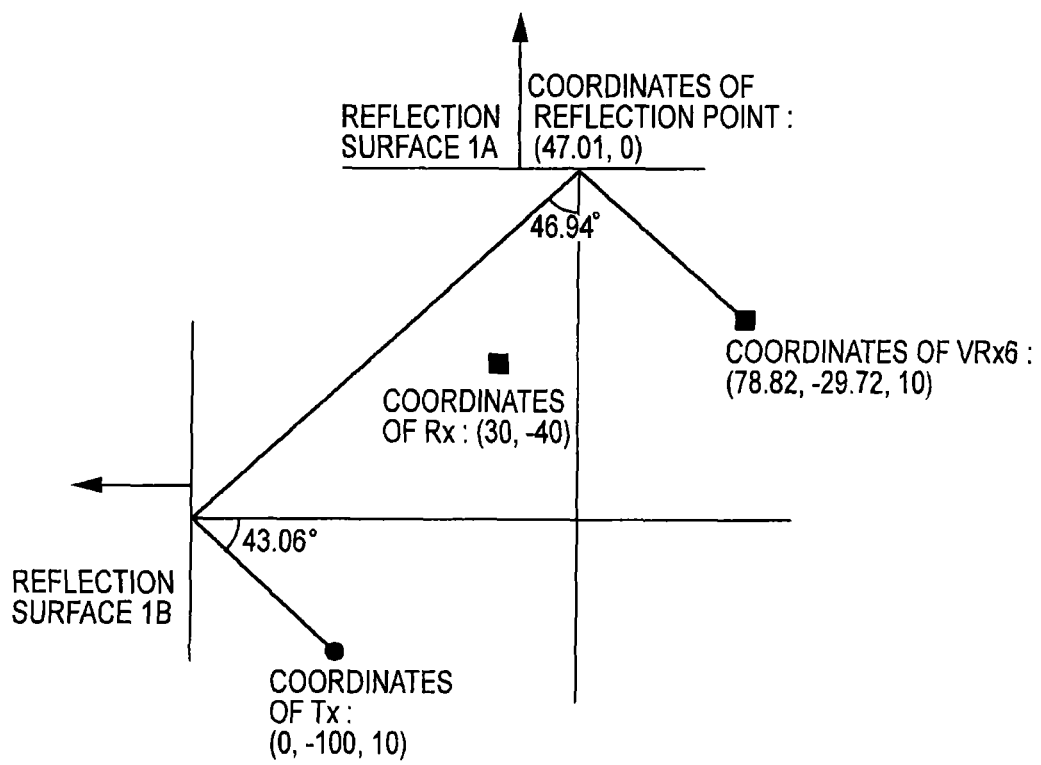
FIG. 52 is a diagram for explaining the propagation path estimation method according to the fifteenth embodiment of the present invention (sixth, 70-degree rotation).
Figure 53:
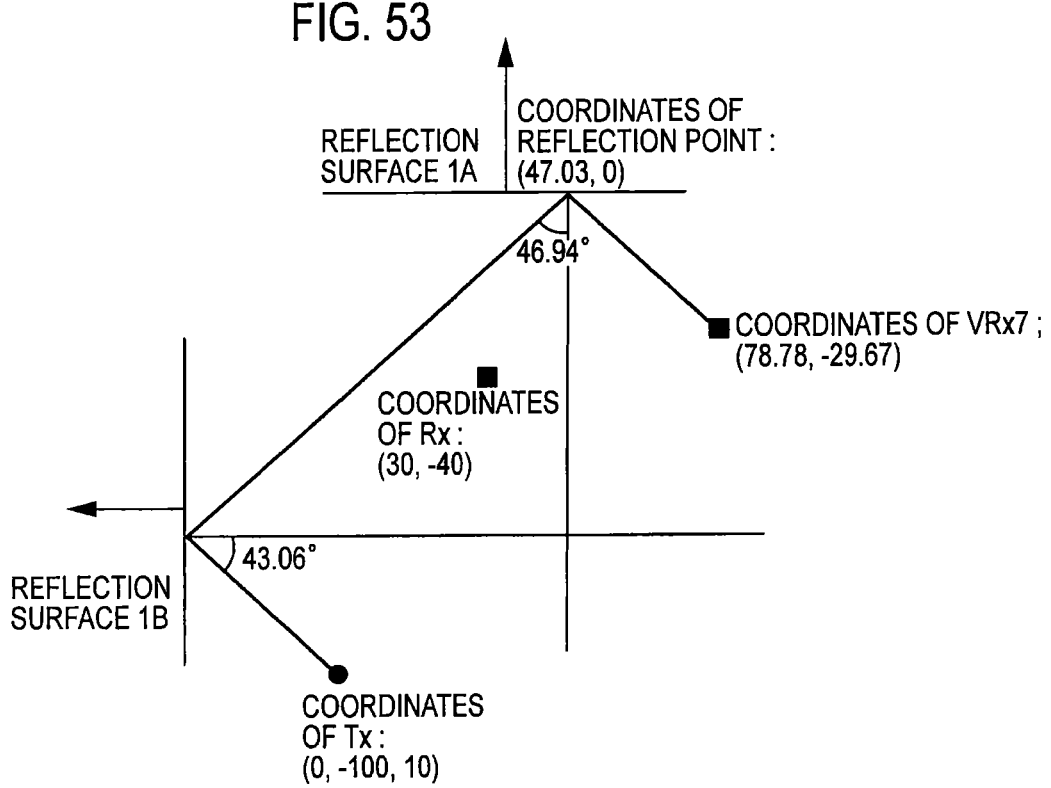
FIG. 53 is a diagram for explaining the propagation path estimation method according to the fifteenth embodiment of the present invention (seventh, 70-degree rotation).

In the same manner, the virtual reception point Rx3 is obtained by rotating Rx about the rotation center $O_3$, as shown in FIG. 49. By repeating same steps, the coordinates of a reflection point PRn are converged as shown in FIG. 50 to FIG. 53.

Figure 54:
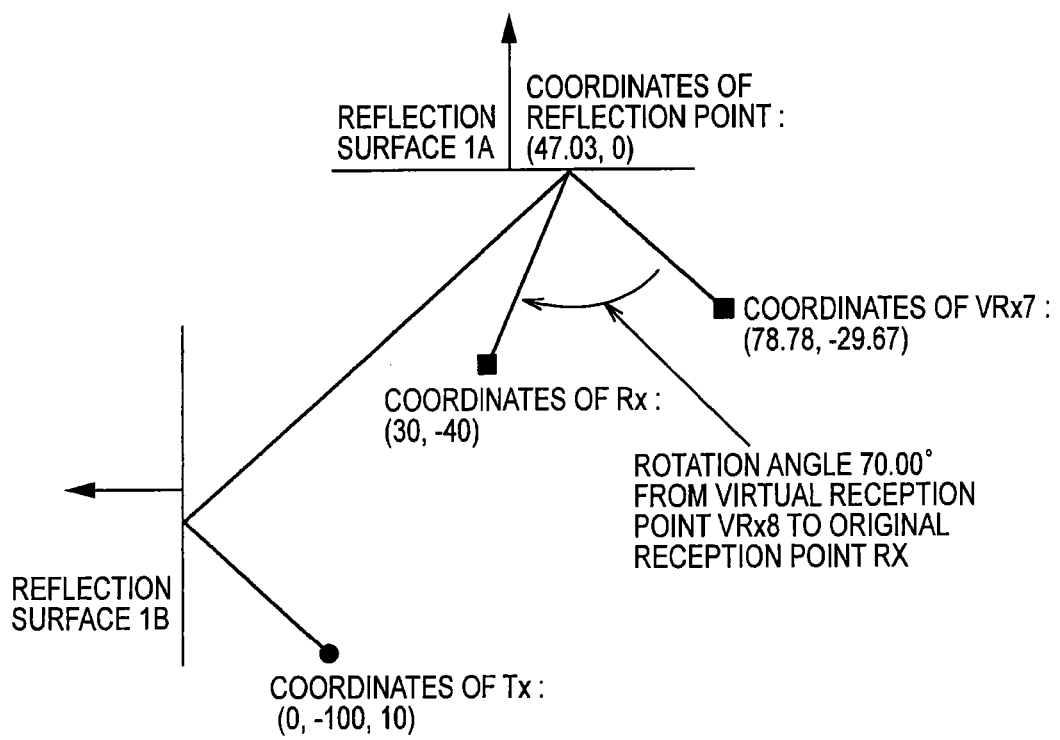
FIG. 54 is a diagram for explaining the propagation path estimation method according to the fifteenth embodiment of the present invention (after convergence, 70-degree rotation).

FIG. 54 shows a convergence state after an 8th rotation. Rotation angle of an original reception point Rx matches 70.00 degrees clockwise from the virtual reception point VRx, which is a reception point when reflection of the reflectarray is the normal reflection. This shows that the coordinates are converged to the calculated propagation path desired to be obtained finally.

Figure 55:
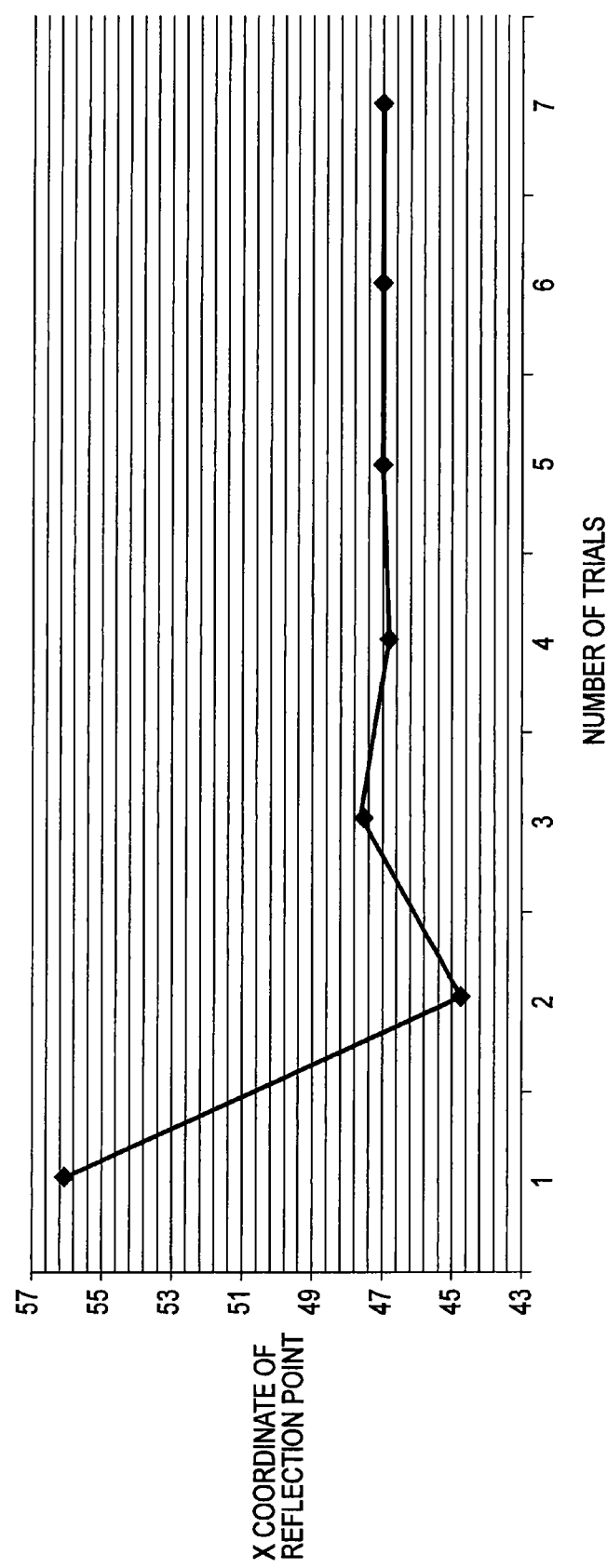
FIG. 55 is a diagram showing a convergence state of the reflection point difference by the propagation path estimation method according to the fifteenth embodiment of the present invention.
Figure 56:
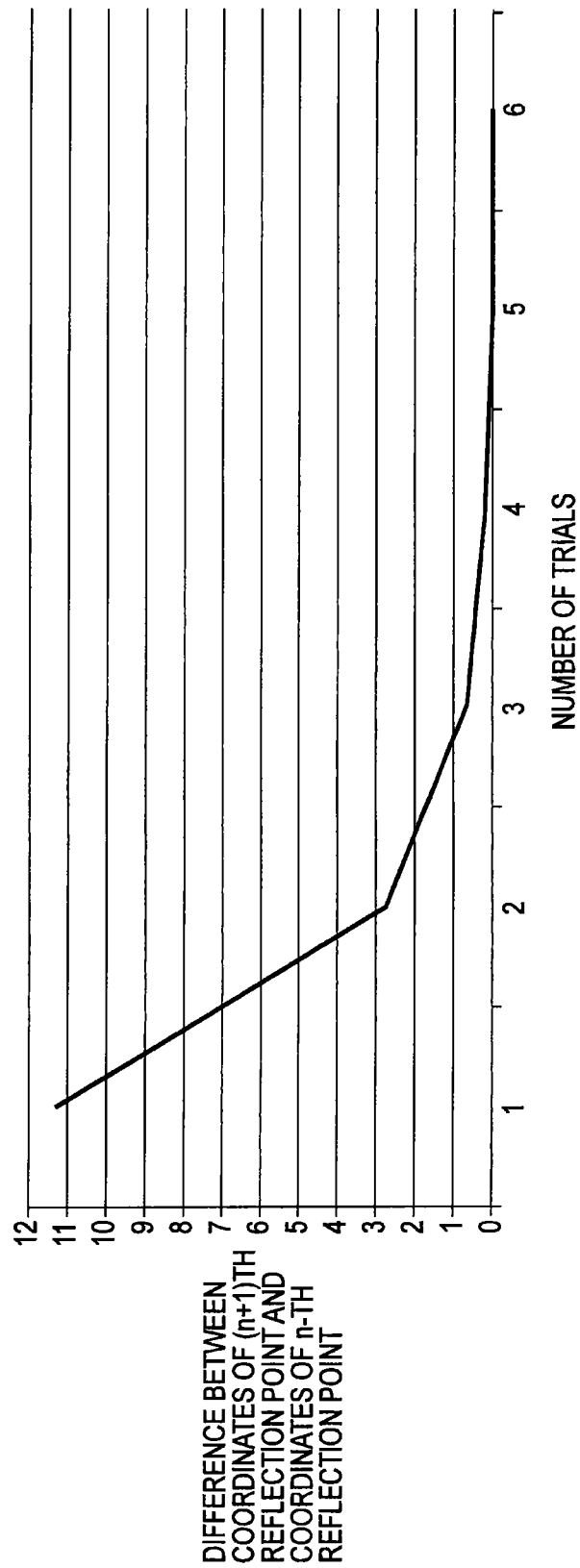
FIG. 56 is a diagram showing a convergence state of the reflection point difference by the propagation path estimation method according to the fifteenth embodiment of the present invention.

FIG. 55 and FIG. 56 show a convergence state of reflection points and a convergence state of a difference between the reflection points respectively. The vertical axis of FIG. 55 represents the x coordinate of a reflection point on the reflectarray reflection surface 1A in an n-th trial, and the vertical axis of FIG. 56 represents the distance between an n-th reflection point PRn and an (n+1)th reflection point PR(n+1). The horizontal axis represents the number of trials n. It is understood that the coordinates of the reflection points are converged rapidly by increasing the number of trials.

Aspects of the embodiments described above may be expressed as follow.

A first aspect of the present embodiment (aspects of the first to the fourth embodiments) is a propagation path estimation method using an imaging method, which is summarized in that: the method includes a step of, in a case where a structure which causes reflection and scattering in a different direction (θ−η)° from a specular reflection direction θ° exists on a propagation path from a transmission point to a reception point RX of the radio wave, calculating a virtual reception point VRX by rotating the reception point RX by η° about a rotation center point O, and estimating the propagation path by using the virtual reception point VRX.

According to the first aspect of the present embodiment (an aspect of the first embodiment), the step mentioned above may include a step A of calculating an image point TX' of the transmission point TX with respect to the structure by using the imaging method; a step B of calculating the rotation center point O; a step C of calculating the virtual reception point VRX by rotating the reception point RX by η° about the rotation center point O; and a step D of calculating the reflection point RP of the radio wave on the structure by using the image point TX' and the virtual reception point VRX.

According to the first aspect of the present embodiment (an aspect of the second embodiment), the step mentioned above may include a step A of calculating an image point TX' of the transmission point TX with respect to the structure by using the imaging method; a step B of calculating the rotation center point O; a step C of calculating the virtual reception point VRX by rotating the reception point RX by η° about the rotation center point O; a step D of calculating the reflection point RP of the radio wave on the structure by using the image point TX' and the virtual reception point VRX; and a step E of updating the rotation center point O to "O−|RP−O|" when a distance between the reflection point RP and the rotation center point O does not satisfy a convergence condition, wherein the steps B to E may be repeated until the distance between the reflection point RP and the rotation center point O satisfies the convergence condition.

According to the first aspect of the present embodiment (an aspect of the third embodiment), the step mentioned above may include a step A of calculating an image point TX' of the transmission point TX with respect to the structure by using the imaging method; a step B of calculating the rotation center point O; a step C of calculating the virtual reception point VRX by rotating the reception point RX by $\eta°$ about the rotation center point O; a step D of calculating a reflection point RP of the radio wave on the structure by using the image point TX' and the virtual reception point VRX, a step E of updating the rotation center point O to "O−Δs" when a distance between the reflection point RP and the rotation center point O does not satisfy a convergence condition, wherein the steps B to E may be repeated until the distance between the reflection point RP and the rotation center point O satisfies the convergence condition.

According to the first aspect of the present embodiment (an aspect of the fourth embodiment), the step mentioned above may include a step of calculating a value x, in an orthogonal coordinate system whose x axis direction is a direction parallel to a reflection surface of the structure and whose y direction is a direction orthogonal to the reflection surface, from an equation of "x=b/{((sin(−$\eta°$)×(c−x)+cos(−$\eta°$)×d−a)/(cos(−$\eta°$)×(c−x)−sin(−$\eta°$)×d−(−b))+x)}+a," where (a, b) represents the coordinates of the transmission point TX, (a, −b) represents the coordinates of the image point TX' with respect to the reflection surface of the transmission point TX, (c, d) represents the coordinates of the reception point RX, and (x, 0) represents the coordinates of the rotation center point O and the reflection point RP of radio wave on the structure.

A second aspect of the present embodiment (aspects of the fifth to the seventh embodiments) is a propagation path estimation method using an imaging method, which is summarized in that the method includes a step of, in a case where a structure which causes reflection and scattering in a different direction ($\theta−\eta$)° from a specular reflection direction $\theta°$ exists on a propagation path from a transmission point to a reception point RX of the radio wave, calculating a virtual transmission point VTX by rotating the transmission point TX by $\eta°$ about a rotation center point, and estimating the propagation path by using the virtual transmission point VTX.

According to the second aspect of the present embodiment (an aspect of the fifth embodiments), the step mentioned above may include a step A of calculating the rotation center point O; a step B of calculating the virtual transmission point VTX by rotating the transmission point TX by $\eta°$ about the rotation center point; a step AC of calculating an image point VTX' of the virtual transmission point VTX' with respect to the structure; and a step D of calculating a reflection point RP of the radio wave on the structure by using the image point VTX' and the reception point RX.

According to the second aspect of the present embodiment (an aspect of the sixth embodiments), the step mentioned above may include a step A of calculating the rotation center point O; a step B of calculating the virtual transmission point VTX by rotating the transmission point TX by $\eta°$ about the rotation center point O; a step AC of calculating an image point VTX' of the virtual transmission point VTX with respect to the structure by using the imaging method; a step D of calculating the reflection point RP of the radio wave on the structure by using the image point VTX' and the reception point RX; and a step E of updating the rotation center point O to "O−|RP−O|" when a distance between the reflection point RP and the rotation center point O does not satisfy a convergence condition, wherein the steps A to E may be repeated until the distance between the reflection point RP and the rotation center point O satisfies the convergence condition.

According to the second aspect of the present embodiment (an aspect of the sixth embodiments), the step mentioned above may include a step A of calculating the rotation center point O; a step B of calculating the virtual transmission point VTX by rotating the transmission point TX by $\eta°$ about the rotation center point O; a step C of calculating an image point VTX' of the virtual transmission point VTX with respect to the structure by using the imaging method; a step D of calculating the reflection point RP of the radio wave on the structure by using the image point VTX' and the reception point RX; and a step E of updating the rotation center point O to "O−Δs" when a distance between the reflection point RP and the rotation center point O does not satisfy a convergence condition, wherein the steps A to E may be repeated until the distance between the reflection point RP and the rotation center point O satisfies the convergence condition.

According to the second aspect of the present embodiment (an aspect of the seventh embodiment), the step mentioned above may include a step of calculating a value x, in an orthogonal coordinate system whose x axis direction is a direction parallel to a reflection surface of the structure and whose y direction is a direction orthogonal to the reflection surface, from a formula of "vb=((sin(−$\eta°$)×c+cos(−$\eta°$)×d−va/(cos(−$\eta°$)×c−sin(−$\eta°$)×d−(−vb))+x)×(x−va))," where (a, b) represents the coordinates of the transmission point TX, (c, d) represents the coordinates of the reception point RX, (x, 0) represents the coordinates of the rotation center point O and the reflection point RP of the radio wave on the structure, and (va (=cos(−$\eta°$)×(a−x)−(sin($\eta°$)×b+x), vb (=sin($\eta°$)×(a−x)+cos($\eta*$)×b)) represents the coordinates of the virtual transmission point VTX.

A third aspect of the present embodiment (an aspect of the eighth embodiment) is a propagation path estimation method summarized in that the method includes: in a case where radio wave is reflected or scattered by a structure K1 (a first structure) which reflects and scatters the radio wave in a different direction ($\theta−\eta$)° from a specular reflection direction $\theta*$, and then is reflected or scattered by a structure K2 (a second structure) which reflects and scatters the radio wave in the specular reflection direction $\theta°$, calculating a first image point TX' of a transmission point TX with respect to the structure K1 and calculating a second image point TX" of the first image point TX' with respect to the structure K2 by using an imaging method; calculating a virtual reception point VRX by rotating a reception point RX by $\eta°$ about a rotation center point O; and estimating a propagation path by using the second image point TX" and the virtual reception point VRX.

A fourth aspect of the present embodiment (an aspect of the ninth embodiment) is a propagation path estimation method summarized in that the method includes: in a case where radio wave is reflected or scattered by a structure K1 (a first structure) which reflects and scatters the radio wave in a specular reflection direction $\theta°$ and then is reflected or scattered by a structure K2 (a second structure) which reflects and scatters the radio wave in a different direction ($\theta−\eta$)° from the specular reflection direction $\theta°$, calculating a virtual reception point VTX by rotating a transmission point TX by $\eta°$ about a rotation center point O; calculating a first image point TX' of the virtual transmission point VTX with respect to the structure K1 and calculating a second image point TX" of the first image point TX' with respect to the structure K2 by using an imaging method; and estimating a propagation path by using the second image point TX" and a reception point RX.

A fifth aspect of the present embodiment is a program or an apparatus causing a computer to implement the propagation path estimation method on a computer.

In other words, the propagation path estimation method may be implemented by hardware, a software module run by a processor, or a combination thereof.

The software module may be provided in a storage medium of any type including RAM (Random Access Memory), flash memory, ROM (Read Only Memory), EPROM (Erasable RProgrammable ROM), EEPROM (Electrically Erasable and RProgrammable ROM), register, hard disk drive, removable disk, and CD-ROM.

The storage medium is connected to the processor in such a manner that the processor can read and write information from and into the storage medium. Instead, the storage medium may be incorporated in the processor. Further, the storage medium may be provided inside ASIC.

Although the present invention is described in detail with reference to the above embodiments, it is apparent to those skilled in the art that the present invention is not limited to the embodiments described herein. The present invention may be implemented by a modification or an alteration without departing from the spirit and the scope defined in the claims. Accordingly, the description herein is intended for illustrative description purpose without limiting the present invention.

Japanese Patent Application Publication No. 2009-278045 (filed on Dec. 7, 2009) is fully incorporated herein by reference.

INDUSTRIAL APPLICABILITY

The present invention provides a propagation path estimation method, program and apparatus that are capable of estimating a propagation path in a propagation analysis model including a directional scatterer and of performing a ray trace analysis and an analysis applying a geometric-optical model. Therefore, the present invention is useful in a wireless communication and the like.

EXPLANATION OF REFERENCE NUMERALS

K . . . Reflectarray
1A . . . Reflection surface
TX . . . Transmission point
VTX . . . Virtual transmission point
RX . . . Reception point
VRX . . . Virtual reception point

The invention claimed is:

1. A propagation path estimation method carried out by an apparatus, the propagation method using an imaging method, the propagation path estimation method comprising:
transmitting a radio wave by a transmitter;
reflecting and scattering the radio wave in a different direction $(\theta-\eta)°$ from a specular reflection direction $\theta°$ on a propagation path by a reflect array structure on the propagation path;
receiving, at a reception point RX, the radio wave reflected and scattered in the different direction by a receiver;
rotating virtually the reception point RX by $\eta°$ about a rotation center point O by a processor of the apparatus, the processor coupled to a storage medium that is provided inside application specific integrated circuit (ASIC) and the processor reading and writing information from and into the storage medium for the rotating;
determining, by the processor, a reflection point RP of the radio wave on the reflect array structure based on the rotating;
updating, by the processor, the rotation center point O when a distance between the reflection point RP and the rotation center point O does not satisfy a convergence condition;
repeating, by the processor, the rotating and determining until the convergence condition is satisfied;
estimating, by the processor, the propagation path of the radio wave when the convergence condition is satisfied; and
applying, by the processor, the estimated propagation path to provide a required communication link quality in a wireless communication system.

2. The propagation path estimation method according to claim 1, the method further comprising:
a step A of calculating an image point TX' of a transmission point TX with respect to the reflect array structure by using the imaging method;
a step B of calculating the rotation center point O; and
a step C of calculating the reflection point RP of the radio wave on the reflect array structure by using the image point TX' and a virtual reception point VRX calculated by the virtual rotation of the reception point RX.

3. The propagation path estimation method according to claim 1, the method further comprising:
a step A of calculating an image point TX' of a transmission point TX with respect to the reflect array structure by using the imaging method;
a step B of calculating the rotation center point O;
a step C of calculating the reflection point RP of the radio wave on the reflect array structure by using the image point TX' and a virtual reception point VRX calculated by the virtual rotation of the reception point RX;
a step D of updating the rotation center point O to "O−|RP−O|" when the distance between the reflection point RP and the rotation center point O does not satisfy a convergence condition,
wherein the steps B to D are repeated until the distance between the reflection point RP and the rotation center point O satisfies the convergence condition.

4. The propagation path estimation method according to claim 1, the method further comprising:
a step A of calculating an image point TX' of a transmission point TX with respect to the reflect array structure by using the imaging method;
a step B of calculating the rotation center point O;
a step C of calculating the reflection point RP of the radio wave on the reflect array structure by using the image point TX' and a virtual reception point VRX calculated by the virtual rotation of the reception point RX; and
a step D of updating the rotation center point O to "O−Δs" when the distance between the reflection point RP and the rotation center point O does not satisfy a convergence condition, Δs being a threshold value,
wherein the steps B to D are repeated until the distance between the reflection point RP and the rotation center point O satisfies the convergence condition.

5. The propagation path estimation method according to claim 1, wherein the method further comprises a step of calculating a value x, in an orthogonal coordinate system whose x axis direction is a direction parallel to a reflection surface of the reflect array structure and whose y direction is a direction orthogonal to the reflection surface, from an equation of "$x=b/\{((\sin(-\eta°)\times(c-x)+\cos(-\eta°)\times d-(-b))/(\cos(-\eta°)\times(c-x)-\sin(-\eta°)\times d-a)+x)\}+a$," where (a, b) represents coordinates of a transmission point TX, (a, −b) represents coordinates of an image point TX' with respect to the reflection surface of a transmission point TX, (c, d) represents coordinates of the reception point RX, and (x, 0) represents coordinates of the rotation center point O and the reflection point RP of radio wave on the reflect array structure.

6. A propagation path estimation method carried out by an apparatus, the propagation method using an imaging method, the propagation path estimation method comprising:
   transmitting a radio wave by a transmitter;
   reflecting and scattering the radio wave in a different direction (θ-η)° from a specular reflection direction θ° on a propagation path by a reflect array structure on the propagation path;
   receiving, at a transmission point TX, the radio wave reflected and scattered in the different direction by a receiver;
   rotating virtually the transmission point TX by η° about a rotation center point O by a processor of the apparatus, the processor coupled to a storage medium that is provided inside application specific integrated circuit (ASIC) and the processor reading and writing information from and into the storage medium for the rotating;
   determining, by the processor, a reflection point RP of the radio wave on the reflect array structure based on the rotating;
   updating, by the processor, the rotation center point O when a distance between the reflection point RP and the rotation center point O does not satisfy a convergence condition;
   repeating, by the processor, the rotating and determining until the convergence condition is satisfied;
   estimating, by the processor, the propagation path of the radio wave when the convergence condition is satisfied; and
   applying, by the processor, the estimated propagation path to provide a required communication link quality in a wireless communication system.

7. The propagation path estimation method according to claim 6, the method further comprising:
   a step A of calculating the rotation center point O;
   a step B of calculating an image point VTX' of a virtual transmission point VTX calculated by the virtual rotation of the transmission point TX with respect to the reflect array structure; and
   a step C of calculating the reflection point RP of the radio wave on the reflect array structure by using the image point VTX' and a reception point RX.

8. The propagation path estimation method according to claim 6, the method further comprising:
   a step A of calculating the rotation center point O;
   a step B of calculating an image point VTX' of a virtual transmission point VTX calculated by the virtual rotation of the transmission point TX with respect to the reflect array structure by using the imaging method;
   a step C of calculating the reflection point RP of the radio wave on the reflect array structure by using the image point VTX' and a reception point RX; and
   a step D of updating the rotation center point O to "O-|RP-O|" when the distance between the reflection point RP and the rotation center point O does not satisfy a convergence condition,
   wherein the steps A to D are repeated until the distance between the reflection point RP and the rotation center point O satisfies the convergence condition.

9. The propagation path estimation method according to claim 6, the method further comprising:
   a step A of calculating the rotation center point O;
   a step B of calculating an image point VTX' of a virtual transmission point VTX calculated by the virtual rotation of the transmission point TX with respect to the reflect array structure by using the imaging method;
   a step C of calculating the reflection point RP of the radio wave on the reflect array structure by using the image point VTX' and a reception point RX; and
   a step D of updating the rotation center point O to "O-Δs" when the distance between the reflection point RP and the rotation center point O does not satisfy a convergence condition, Δs being a threshold value,
   wherein the steps A to D are repeated until the distance between the reflection point RP and the rotation center point O satisfies the convergence condition.

10. The propagation path estimation method according to claim 6, where the method comprises a step of calculating a value x, in an orthogonal coordinate system whose x axis direction is a direction parallel to a reflection surface of the reflect array structure and whose y direction is a direction orthogonal to the reflection surface, from a formula of "−vb= ((sin(−η°)×(a−x)+cos(−η°)×b−d/(cos(−η°)×(a−x)−sin(−η°)×b+x−c)×(x−va))," where (a, b) represents coordinates of the transmission point TX, (c,d) represents coordinates of a reception point RX, (x, 0) represents coordinates of the rotation center point O and the reflection point RP of the radio wave on the reflect array structure, and (va (=cos(−η°)×(a−x)−(sin(η°)×b+x), vb (=sin(η°)×(a−x)+cos(η°)×b)) represents coordinates of a virtual transmission point VTX calculated by the virtual rotation of the transmission point TX.

11. The propagation path estimation method according to any one of claims 1 to 10, wherein the η° is a function of the θ°.

12. A non-transitory computer readable medium storing a computer readable program thereon that, when executed by a computer, causes the computer to perform the propagation path estimation method according to claim 1.

13. An apparatus causing a computer to implement the propagation path estimation method according to claim 1.

* * * * *